(12) United States Patent
Kakuda et al.

(10) Patent No.: US 8,154,160 B2
(45) Date of Patent: Apr. 10, 2012

(54) DRIVE DEVICE CONTROL UNIT

(75) Inventors: Kentaro Kakuda, Anjo (JP); Ryohei Kubo, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 627 days.

(21) Appl. No.: 12/320,338

(22) Filed: Jan. 23, 2009

(65) Prior Publication Data
US 2009/0213564 A1 Aug. 27, 2009

(30) Foreign Application Priority Data
Feb. 21, 2008 (JP) .................. 2008-040376

(51) Int. Cl.
*H02K 11/00* (2006.01)

(52) U.S. Cl. ........................ 310/66; 310/68 R
(58) Field of Classification Search .............. 310/66, 310/67 R, 68 R, 68 D
See application file for complete search history.

(56) References Cited

U.S. PATENT DOCUMENTS

| 6,181,590 B1 | 1/2001 | Yamane et al. | |
| 7,012,446 B2 * | 3/2006 | Taguchi et al. | 324/117 R |
| 2004/0124332 A1 * | 7/2004 | Takenaka et al. | 248/648 |
| 2009/0243443 A1 * | 10/2009 | Aoki et al. | 310/68 D |

FOREIGN PATENT DOCUMENTS

| JP | A-2000-350474 | 12/2000 |
| JP | A-2003-199363 | 7/2003 |
| JP | A-2007-089259 | 4/2007 |

* cited by examiner

*Primary Examiner* — Nguyen N Hanh
(74) *Attorney, Agent, or Firm* — Oliff & Berridge, PLC

(57) ABSTRACT

A drive device control unit that controls a drive device including a rotating electrical machine, the drive device control unit includes a control substrate that controls the drive device; a switching element module that forms an inverter that drives the rotating electrical machine; a smoothing capacitor that smoothes an input power supply of the inverter; a first base having the switching element module fixed thereto; and a second base supported by the first base and having the smoothing capacitor fixed to a first surface of the second base, wherein the control substrate is fixed to a second surface of the second base opposite to the first surface having the smoothing capacitor fixed thereto.

19 Claims, 11 Drawing Sheets

US 8,154,160 B2

DRIVE DEVICE CONTROL UNIT

INCORPORATION BY REFERENCE

The disclosure of Japanese Patent Application No. 2008-040376 filed on Feb. 21, 2008 including the specification, drawings and abstract is incorporated herein by reference in its entirety.

BACKGROUND

The present invention relates to a drive device control unit.

A drive device control unit that is integrally fixed to a drive device has been recently developed as a control unit of a drive device having a rotating electrical machine (a motor and a generator) for use in an electric vehicle, a hybrid vehicle, and the like (e.g., see, for example, Japanese Patent Application Publication No. JP-A-2003-199363 (pages 5 to 7, FIG. 1)). There is a demand for TIUI drive device control unit to have improved reliability by assuring resistance to the vibration of a drive device and to have a reduced size, a reduced weight, a reduced number of parts, and improved manufacturability.

In order to meet such demands, a drive device control unit described in Japanese Patent Application Publication No. JP-A-2003-199363 (pages 5 to 7, FIG. 1) is a unit accommodating an inverter for driving a rotating electrical machine included in a drive device and includes a control substrate that controls the drive device. The drive device control unit includes a case for mounting a switching element power module of the inverter, a capacitor bracket for mounting a smoothing capacitor for the inverter, and a control substrate bracket for mounting the control substrate. The capacitor bracket is fixed to the case and the control substrate bracket is fixed to the capacitor bracket.

SUMMARY

The above drive device control unit includes two brackets: the capacitor bracket for fixing the smoothing capacitor; and the control substrate bracket for fixing the control substrate. In other words, the control substrate bracket having a planar substrate-fixing surface is provided separately from the capacitor bracket having a top surface of a complicated convexo-concave shape corresponding to the shape of the smoothing capacitor. The control substrate bracket is thus provided separately from the capacitor bracket in order to assure a required number of fixing portions of the control substrate at appropriate positions, and thus to improve vibration resistance of the control substrate. However, these brackets need to be rigid enough to assure the vibration resistance. Such a required rigidity results in an increase in the weight of the drive device control unit and the number of parts.

The present invention is made in view of the above problems and it is an object of the present invention to provide a drive device control unit capable of reliably fixing each part to assure vibration resistance, and capable of reducing the number of parts to implement a reduction in size and weight. The present invention can also achieve various other advantages.

According to an exemplary aspect of the invention, a drive device control unit that controls a drive device including a rotating electrical machine, includes a control substrate that controls the drive device; a switching element module that forms an inverter that drives the rotating electrical machine; a smoothing capacitor that smoothes an input power supply of the inverter; a first base having the switching element module fixed thereto; and a second base supported by the first base and having the smoothing capacitor fixed to a first surface of the second base, wherein the control substrate is fixed to a second surface of the second base opposite to the first surface having the smoothing capacitor fixed thereto.

According to an exemplary aspect of the invention, a drive device control unit that controls a drive device including a rotating electrical machine, includes a control substrate that controls the drive device; a switching element module that forms an inverter that drives the rotating electrical machine; a smoothing capacitor that smoothes an input power supply of the inverter; a first base having the switching element module fixed thereto; and a second base supported by the first base and having the control substrate and the smoothing capacitor fixed to the second base.

BRIEF DESCRIPTION OF THE DRAWINGS

Various exemplary aspects of the invention will be described with reference to the drawing, wherein.

DETAILED DESCRIPTION OF EMBODIMENTS

Hereinafter, embodiments of the present invention will be described with reference to the accompanying drawings. First, a first embodiment will be described. Description is herein given to an example in which the present invention is applied to a drive device control unit 1 for controlling a drive device 2 for a hybrid vehicle.

1. Structure of the Drive Device

Figure 4:
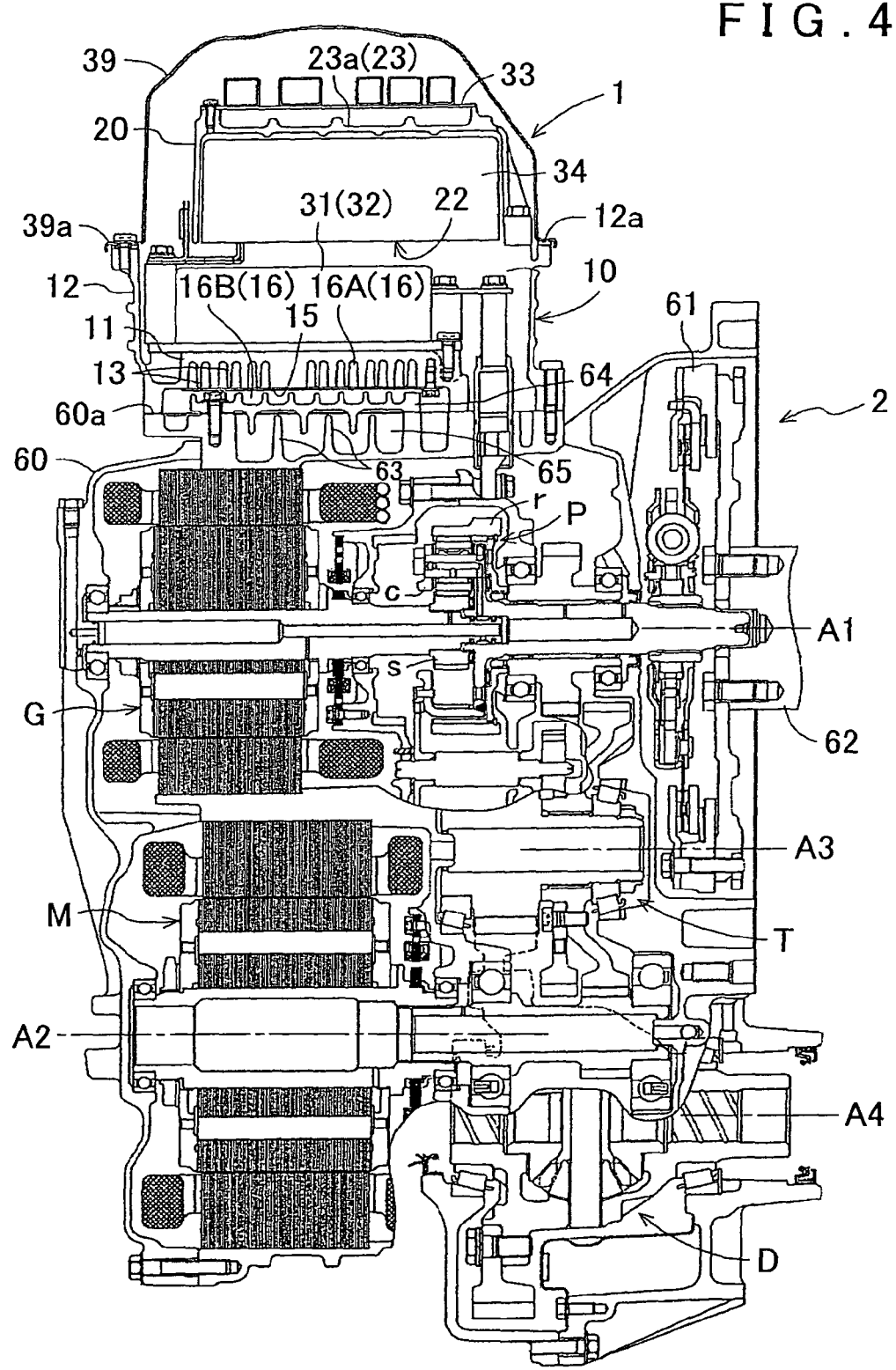
FIG. 4 is a cross-sectional view of the drive device taken in an axial direction.

First, a structure of the drive device 2 for a hybrid vehicle, which is to be controlled by the drive device control unit 1 of the present embodiment, will be described. As shown in FIG. 4, the drive device 2 mainly includes a generator G and a planetary gear mechanism P as a power transfer which are mounted on a first shaft A1, a motor M mounted on a second shaft A2, and a differential device D mounted on a fourth shaft A4. A counter gear mechanism T for drivingly connecting an output rotating element of the planetary gear mechanism P and the motor M to the differential device D is mounted on a third shaft A3. The planetary gear mechanism P is herein a single pinion type planetary gear mechanism. A sun gear s is connected to the generator G, a carrier c is connected to an output shaft 62 of an engine through a damper 61 mounted on the first shaft A1, and a ring gear r is an output rotating element and is drivingly connected to the counter gear mechanism T. Each structure of the drive device 2 is accommodated in a drive device case 60. In the present embodiment, the motor M and the generator G correspond to rotating electrical machines of the present invention.

Figure 3:
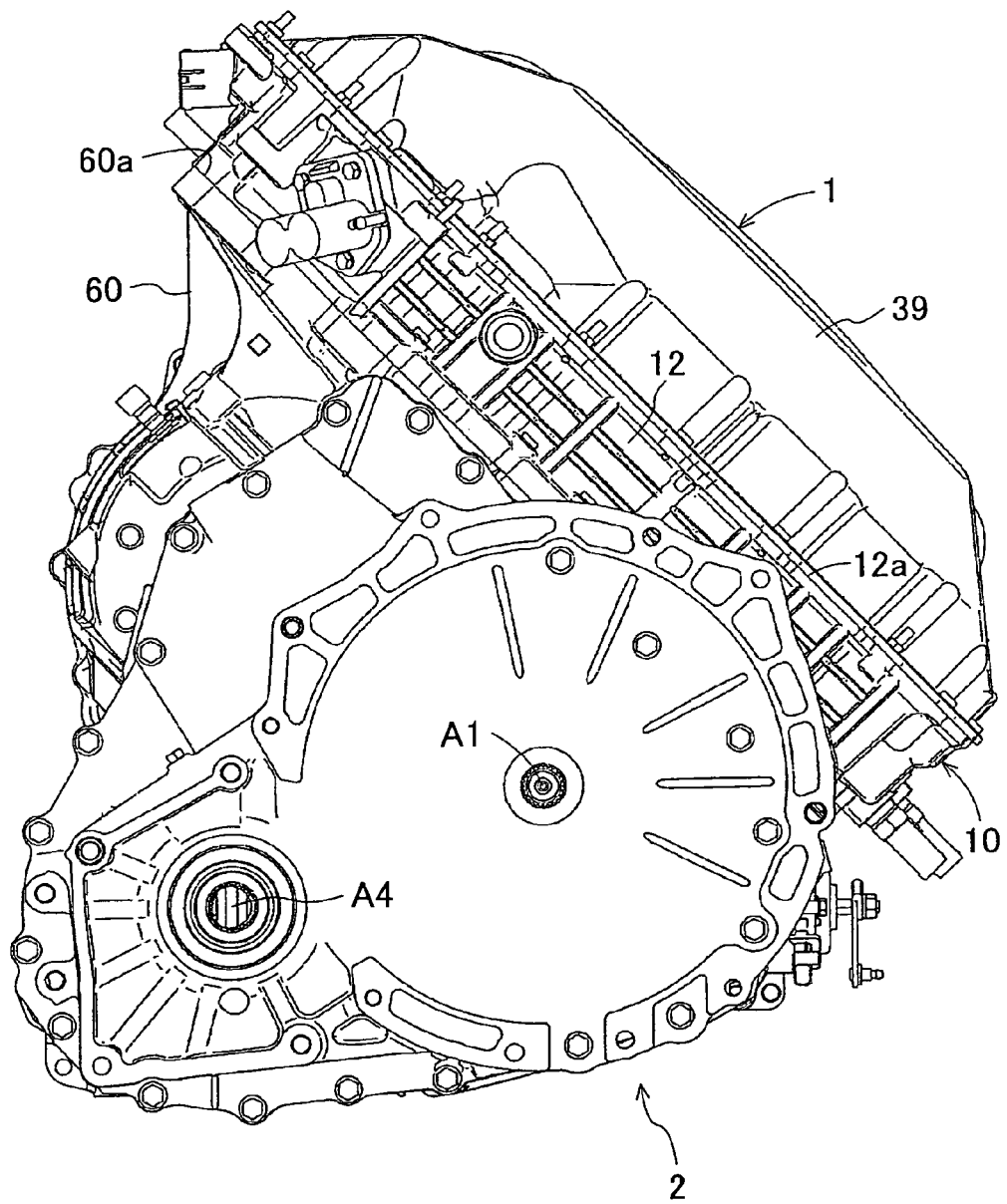
FIG. 3 is a side view of a drive device having the drive device control unit integrally attached thereto.

The drive device control unit 1 is integrally attached to the top of the drive device 2. More specifically, as shown in FIG. 3, a case frame 10 corresponding to a first base of the drive device control unit 1 is fixedly fastened to a tilted top surface 60a of the drive device case 60. The top surface 60a of the drive device case 60 is herein tilted so as to substantially contact the respective outer diameters of the motor M and the generator G. The drive device control unit 1 is thus integrally attached to the drive device case 60. In addition to attaching the drive device control unit 1 to the drive device 2 in a tilted state, a cover 39 of the drive device control unit 1 has an approximately trapezoidal shape in a side view of the drive device 2 viewed from the side on which it is connected to the engine, and the width (the length in a direction parallel to the top surface 60a) of the trapezoidal shape is reduced as the distance from the drive device case 60 is increased. The cover 39 of the drive device control unit 1 is formed so that one side of the cover 39 extends approximately horizontally and the other side thereof extends approximately vertically when the drive device control unit 1 is attached to the drive device 2. The overall structure of the drive device 2 having the drive device control unit 1 integrally attached thereto therefore has a small outer shape that does not protrude so much in an upward direction and a lateral direction (right-hand direction in FIG. 3).

As shown in FIG. 4, a cooling structure for cooling switching element modules 31, 32, the motor M, the generator G, and the like is provided at a joint between the drive device control unit 1 and the drive device 2. This cooling structure has a hydraulic fluid flow path 65 in which a hydraulic fluid circulating within the drive device 2 flows and a refrigerant flow path 16 in which a refrigerant such as cooling water and cooling fluid flows. The cooling structure performs heat exchange between the hydraulic fluid flow path 65 and the refrigerant flow path 16. In the present embodiment, the hydraulic fluid flow path 65 is formed as a space having fins 63 on the top surface of the drive device case 60. A heat transmission wall 64 is attached so as to cover an opening plane of the hydraulic fluid flow path 65. The heat transmission wall 64 has heat transmission fins on its both surfaces and performs heat exchange between the hydraulic fluid in the hydraulic fluid flow path 65 and the refrigerant in the refrigerant flow path 16. The refrigerant flow path 16 is divided into two stages, that is, upper and lower stages, by a flat-plate like separating member 15 attached to a bottom surface of a bottom portion 11 of the case frame 10. The stage located on the case frame 10 side of the separating member 15 is an upper stage refrigerant flow path 16A and the stage located on the drive device case 60 side of the separating member 15 is a lower stage refrigerant flow path 16B. The upper stage refrigerant flow path 16A is formed as a space between cooling fins 13 that are integrally formed in the bottom portion 11 of the case frame 10. The separating member 15 is attached so as to cover an opening plane of the space. The lower stage refrigerant flow path 16B is formed as a space between the separating member 15 and the heat transmission wall 64 and around the separating member 15 and the heat transmission wall 64.

The hydraulic fluid heated to a high temperature while circulating within the drive device 2 is cooled in the hydraulic fluid flow path 65 by exchanging heat with the refrigerant flowing in the lower stage refrigerant flow path 16B through the heat transmission wall 64. As described below, since a large current flows through the switching element modules 31, 32, the switching element modules 31, 32 generate a large amount of heat. The switching element modules 31, 32 are therefore mounted in contact with a top surface of the bottom portion 11 of the case frame 10. The switching element modules 31, 32 are cooled by exchanging heat with the refrigerant flowing through the upper stage refrigerant flow path 16A through the cooling fins 13 formed in the bottom portion 11 of the case frame 10. In order to carry out such heat exchange, the case frame 10 including the cooling fins 13 and the heat transmission wall 64 are preferably made of a highly thermally conductive material such as aluminum. The separating member 15, on the other hand, is preferably made of a low thermally conductive material in order to suppress heat exchange between the upper stage refrigerant flow path 16A and the lower stage refrigerant flow path 16B.

2. Schematic Overall Structure of the Drive Device Control Unit

Figure 1:
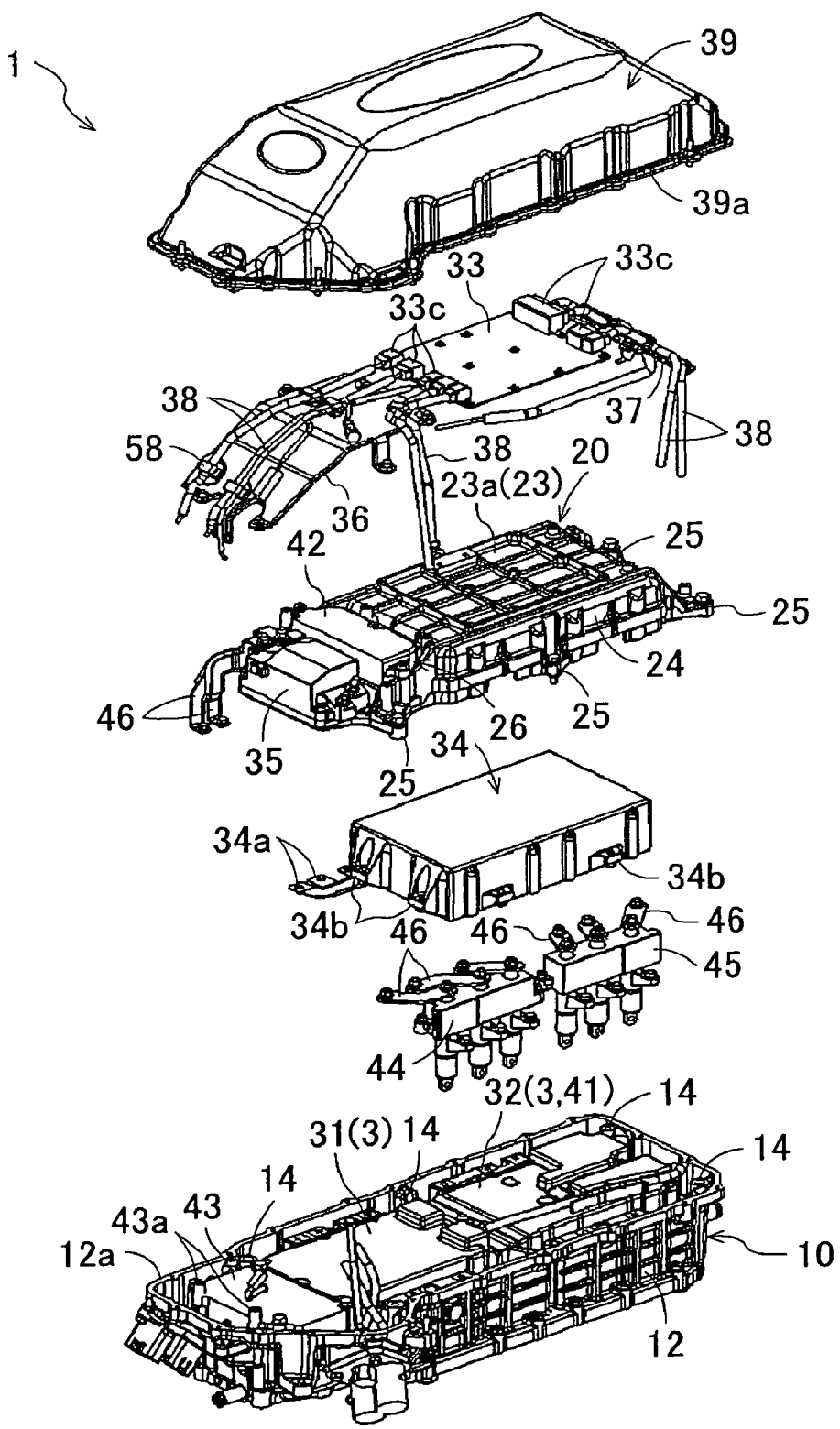
FIG. 1 is an exploded perspective view of a drive device control unit according to a first embodiment of the present invention.
Figure 2:
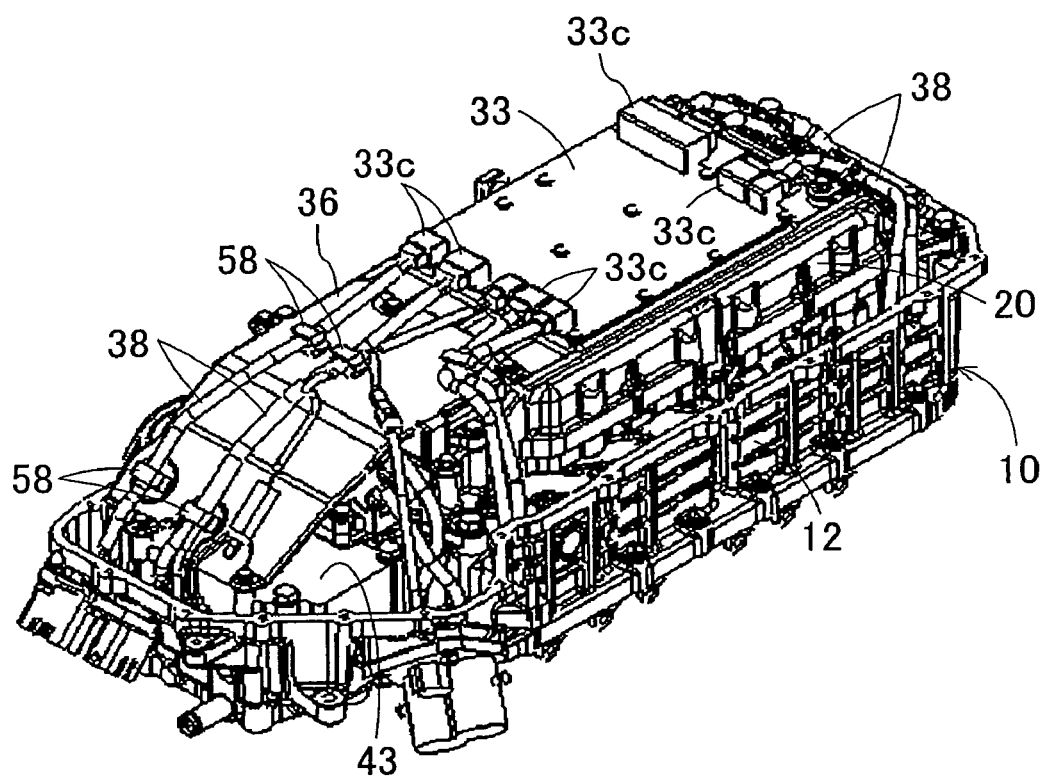
FIG. 2 is a perspective view showing a state of the drive device control unit with a cover removed.

A schematic overall structure of the drive device control unit 1 will now be described. Note that, in the following description, the term "top" or "upper" indicates the cover 39 side of the drive device control unit 1 (the upper side in FIGS. 1, 2, 4, 6 through 8, and 11) and the term "bottom" or "lower" indicates the case frame 10 side of the drive device control unit 1 (the lower side in FIGS. 1, 2, 4, 6 through 8, and 11) unless otherwise specified. As shown in FIGS. 1 and 2, the drive device control unit 1 includes a control substrate 33 for controlling the drive device 2, the first switching element module 31 and the second switching element module 32 forming an inverter 3 for driving (controlling) the motor M and the generator G, a smoothing capacitor 34 for smoothing an input power supply of the inverter 3, the case frame 10 as the first base having the switching element modules 31, 32 fixed thereto, and the support bracket 20 as a second base supported by the case frame 10 and having the control substrate 33 fixed to its one surface (top surface) and the smoothing capacitor 34 fixed to the other surface (bottom surface).

The drive device control unit 1 further includes a step-up switching unit 41 including step-up switching elements 8 (see FIG. 5), a step-up capacitor 42, and a reactor 43. The step-up switching unit 41, the step-up capacitor 42, and the reactor 43 form a step-up device 4 for stepping up a power supply voltage. The step-up switching unit 41 is integrally incorporated into the second switching element module 32 as described later. The step-up switching unit 41 is thus fixed to the same surface in the case frame 10 as that to which the switching element modules 31, 32 are fixed. The reactor 43 is fixed to the case frame 10, and the step-up capacitor 42 is fixed to the support bracket 20. The drive device control unit 1 further includes a noise filter 35 for removing a power supply noise. The noise filter 35 is fixed to the support bracket 20 at a position adjacent to the step-up capacitor 42.

The case frame 10 has the bottom portion 11 (see FIG. 4) and a peripheral wall portion 12 that is provided so as to surround a peripheral edge of the bottom portion 11. The case frame 10 has a box shape having its top surface, a surface on the support bracket side 20, being opened. The case frame 10 is made of a metal material such as aluminum and is manufactured by die-casting or the like. The bottom portion 11 herein has an approximately rectangular planar shape, and the case frame 10 has an approximately rectangular parallelepiped box shape having its top surface opened. Note that a plurality of ribs are formed on an outer peripheral surface of the peripheral wall portion 12 in order to increase a heat dissipation property of the case frame 10 and to implement a reduced weight and an increased rigidity. The first switching element module 31, the second switching element module 32, and the reactor 43 are fixedly accommodated in the case frame 10. The first switching element module 31, the second switching element module 32, and the reactor 43 are mounted in contact with the bottom portion 11 (see FIG. 4). A first current sensor 44 for detecting the magnitude of a current flowing from the first switching element module 31 to the motor M and a second current sensor 45 for detecting the magnitude of a current flowing from the second switching element module 32 to the generator G are also accommodated in the case frame 10. A plurality of mounting/attaching portions 14 for attaching the support bracket 20 are provided along an inner peripheral surface of the peripheral wall portion 12 of the case frame 10. The support bracket 20 is fixedly fastened to the mounting/attaching portions 14 and thus supported by the mounting/attaching portions 14.

Figure 7:
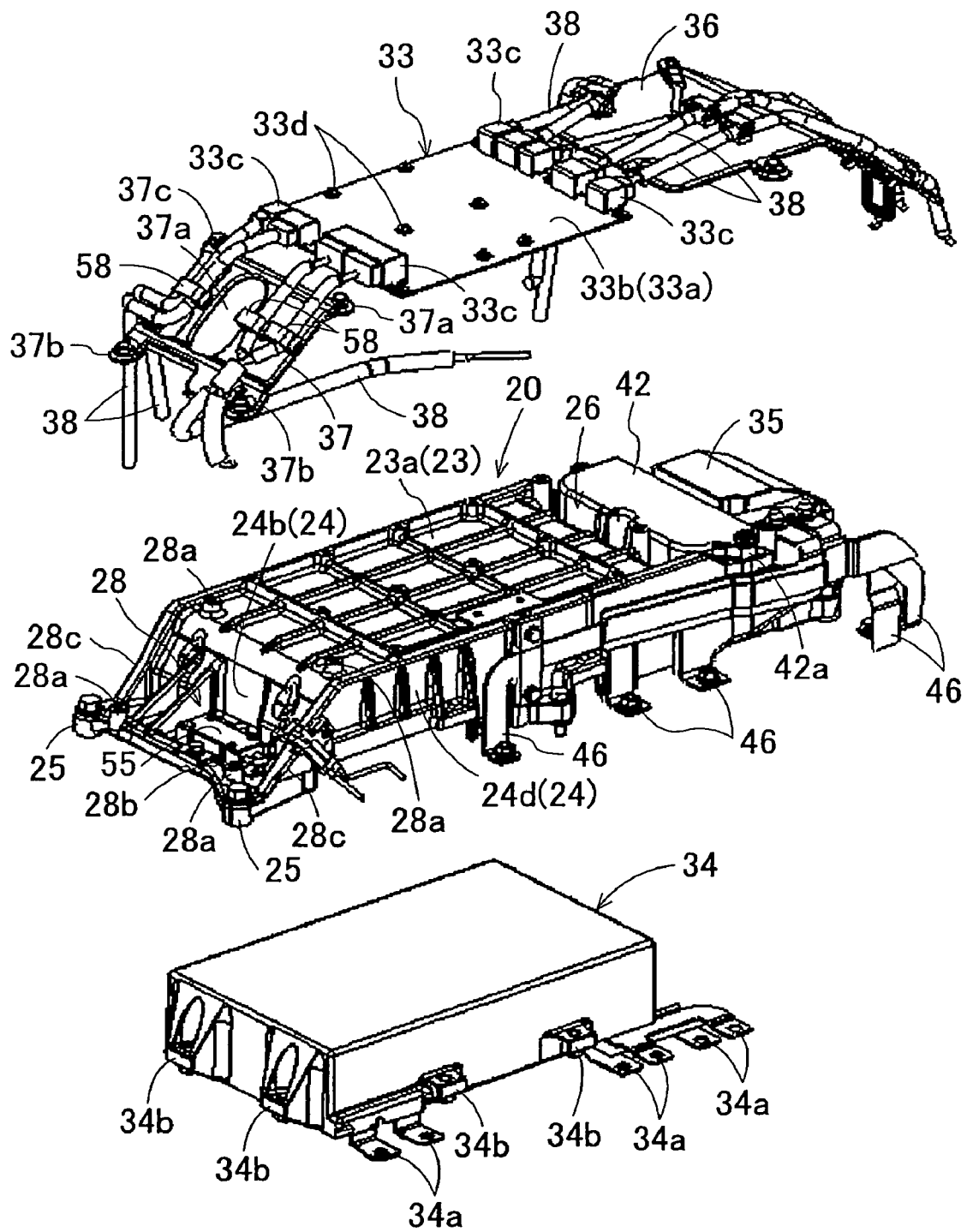
FIG. 7 is an exploded perspective view showing the main part of the drive device control unit from a different direction from that of FIG. 6.
Figure 8:
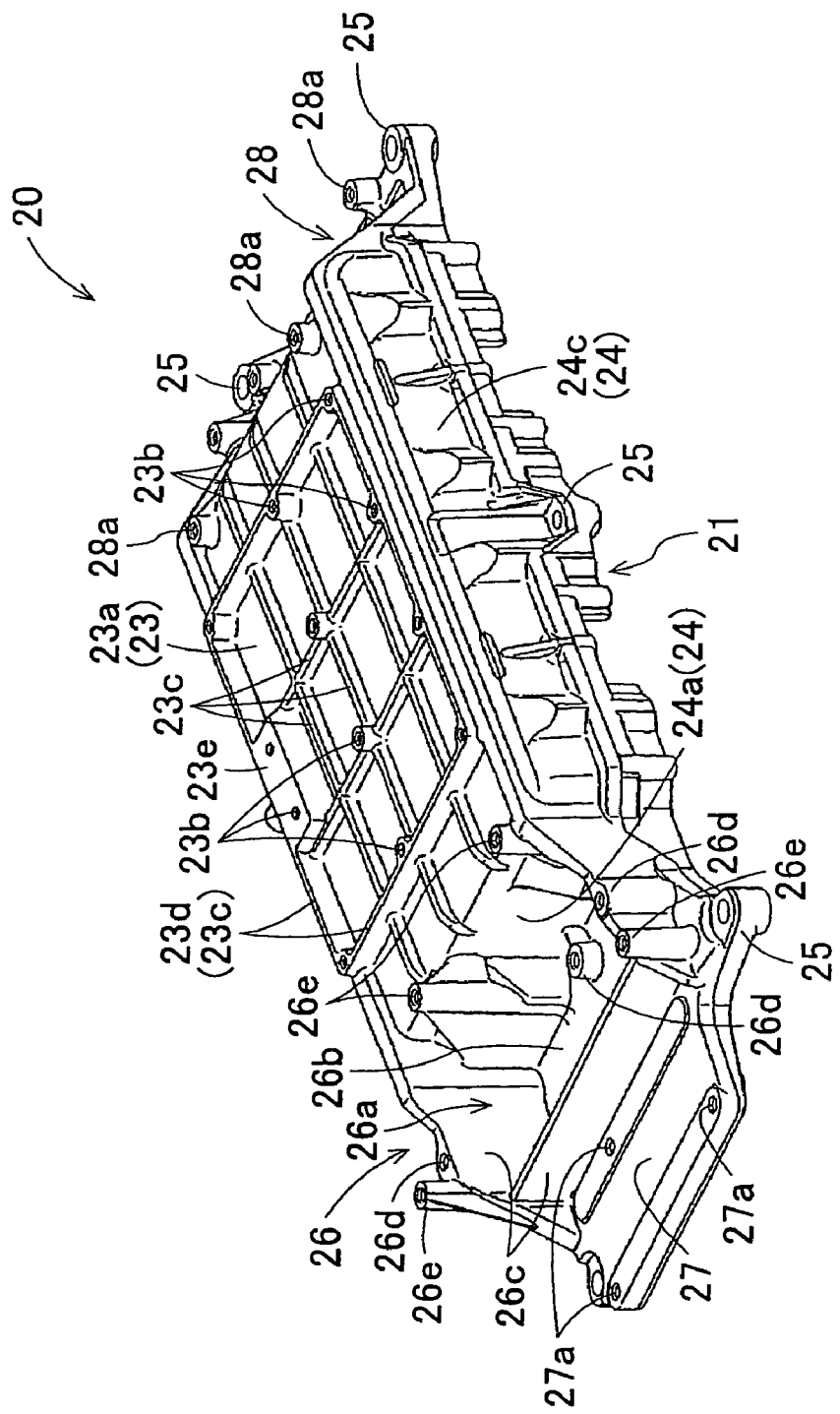
FIG. 8 is a perspective view showing an upper side of a support bracket.
Figure 9:
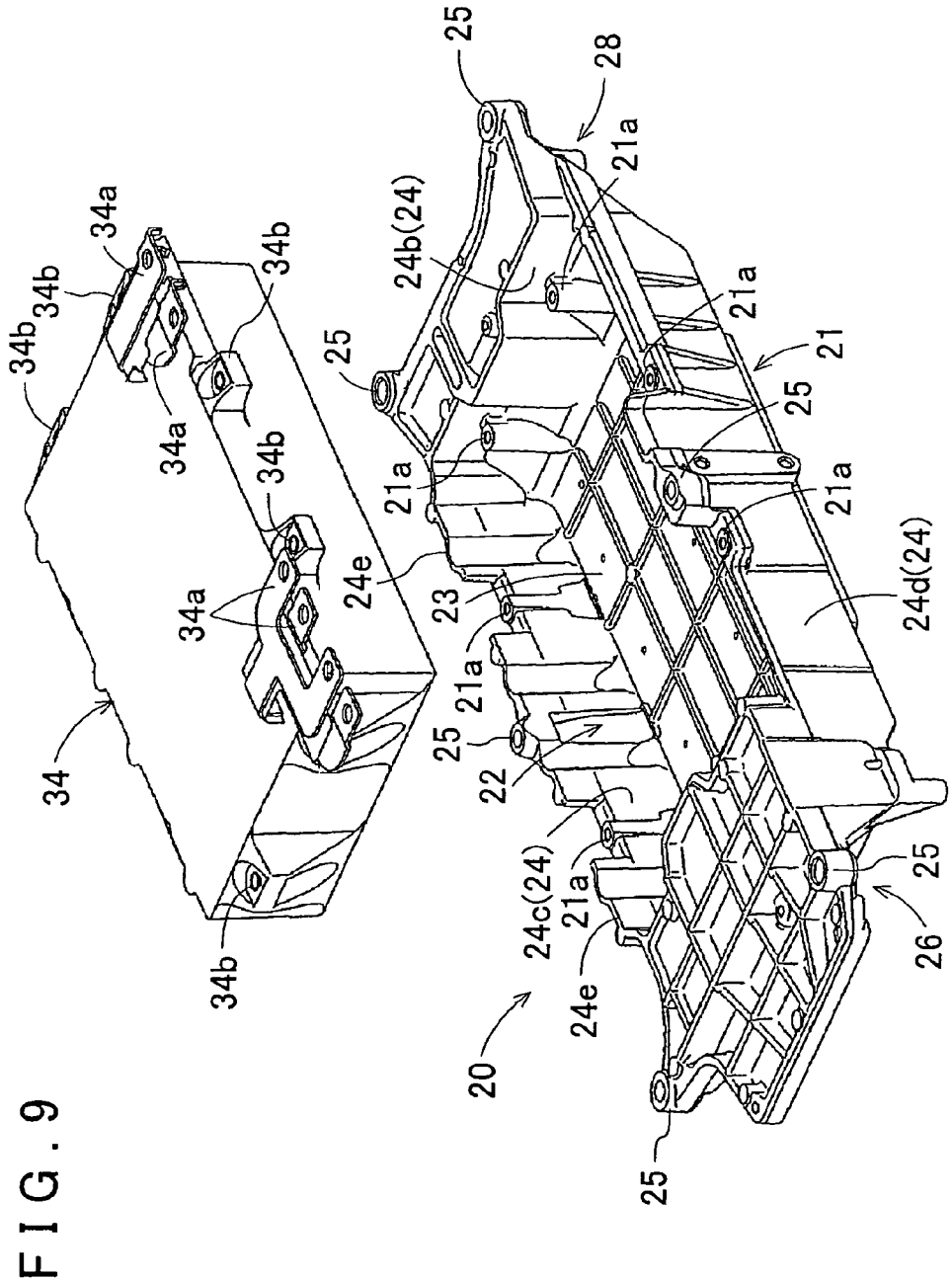
FIG. 9 is a perspective view showing a lower side of the support bracket and a smoothing capacitor fixed therein.

The support bracket 20 has a first box-shaped portion 21 (see FIGS. 8 and 9) having an opening 22 which is open at a bottom surface (in a downward direction) of the first box-shaped portion 21, that is, at a surface on the case frame 10 side, a bottom portion 23 having an approximately flat plate shape, and a peripheral wall portion 24 that is provided so as to surround a peripheral edge of the bottom portion 23. This support bracket 20 is made of a metal material such as aluminum and is manufactured by die-casting or the like. The smoothing capacitor 34 is fixedly accommodated within the first box-shaped portion 21 of the support bracket 20. As shown in FIGS. 1, 7, and 9, the smoothing capacitor 34 has an approximately rectangular parallelepiped shape, and includes connection terminals 34a protruding to the outside from the opening 22 when the smoothing capacitor 34 is accommodated in the first box-shaped portion 21. The control substrate 33 is fixed to an outer surface 23a of the bottom portion 23 of the first box-shaped portion 21. As shown in FIG. 8, the support bracket 20 has a second box-shaped portion 26 located adjacent to the first box-shaped portion 21. The second box-shaped portion 26 has an opening 26a that is open at a top surface (in an upward direction) of the second box-shaped portion 26 in the opposite direction to the opening direction of the first box-shaped portion 21. The step-up capacitor 42 is fixedly accommodated within the second box-shaped portion 26. The noise filter 35 is fixed to the opposite side of the step-up capacitor 42 to the first box-shaped portion 21 in the support bracket 20.

As shown in FIG. 1, a first wiring bracket 36 is fixed to one side of a longitudinal direction of the support bracket 20 and a second wiring bracket 37 is fixed to the other side of the longitudinal direction of the support bracket 20 so that the first wiring bracket 36 and the second wiring bracket 37 are located adjacent to the control substrate 33. In the present embodiment, the first wiring bracket 36 corresponds to a cover member of the present invention. Cables 38 connected to the control substrate 33 are fixed to respective top surfaces of the first wiring bracket 36 and the second wiring bracket 37 by using clamp members 58 (see FIGS. 6 and 7). The switching element modules 31, 32, the smoothing capacitor 34, the step-up capacitor 42, the reactor 43, the current sensors 44,45, and the like are electrically connected by a plurality of bus bars 46 connecting predetermined terminals of the parts to each other in order to form an electric circuit (see FIG. 5) described later.

The cover 39 is fixed to the top surface of the case frame 10, more specifically, to an upper end face 12a of the peripheral wall portion 12. As a result, the inner space covered by the case frame 10 and the cover 39 has a fluid-tight structure, and each member fixed within the case frame 10 and fixed to the support bracket 20 can be protected. Note that fastening holes are formed in a flange-like peripheral edge 39a at a lower end of the cover 39, and a plurality of boltholes are formed along the upper end surface 12a of the peripheral wall portion 12 of the case frame 10. The cover 39 is fixed to the case frame 10 by inserting bolts as fastening members into the fastening holes of the cover 39 and then fixedly fastening the bolts in the plurality of boltholes of the case frame 10.

3. Structure of the Electric Circuit of the Drive Device Control Unit

Figure 5:
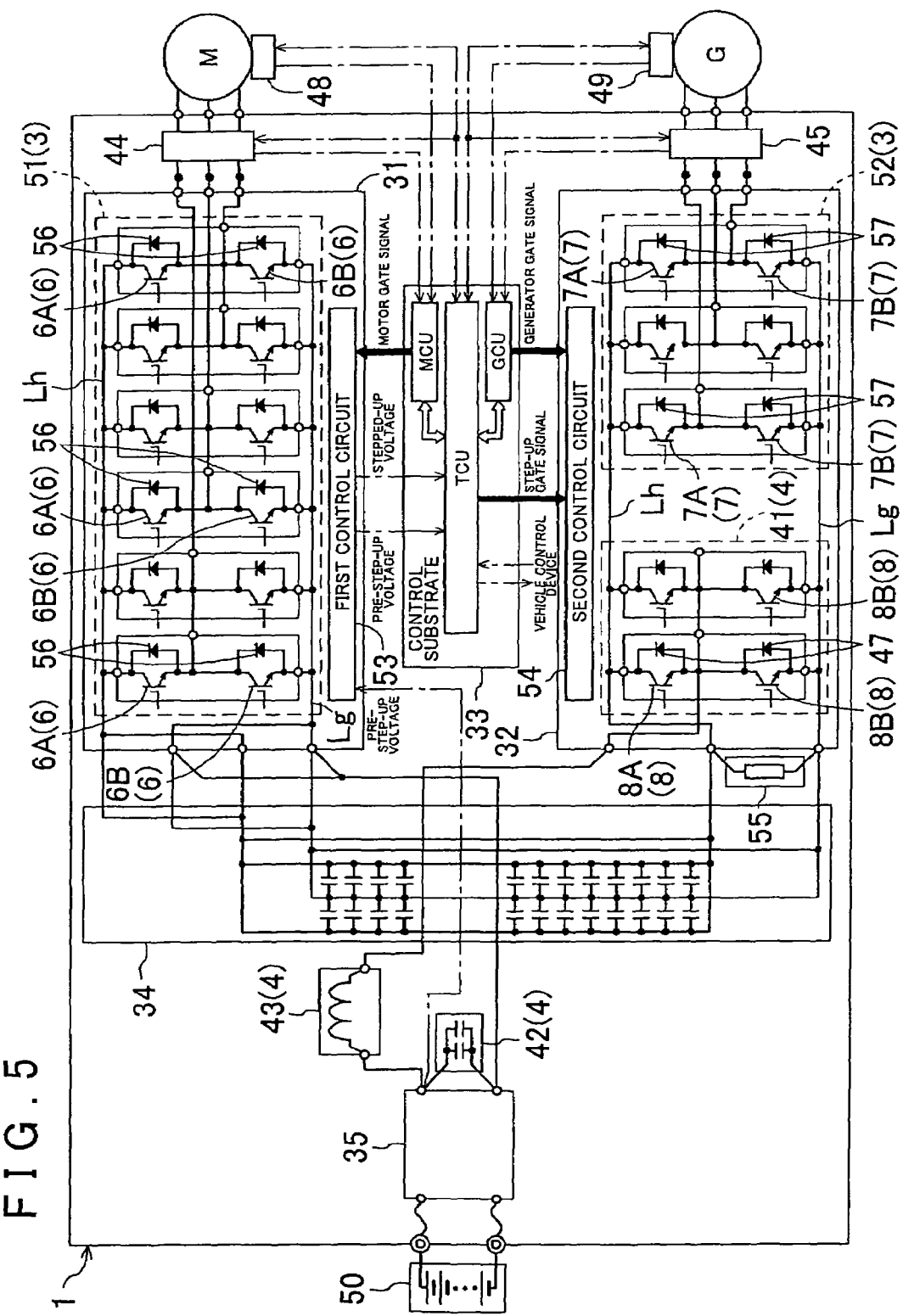
FIG. 5 is a schematic diagram showing a circuit structure of the drive device control unit.

A structure of the electric circuit of the drive device control unit 1 will now be described. The drive device control unit 1 controls the motor M and the generator G of the drive device 2. The motor M and the generator G are herein rotating electrical machines that are driven by a three-phase alternating current. As shown in FIG. 5, the drive device control unit 1 includes as circuit components of the electric circuit the first switching element module 31, the second switching element module 32, the control substrate 33, the smoothing capacitor 34, the noise filter 35, a discharging resistor 55, the step-up capacitor 42, the reactor 43, the first current sensor 44, and the second current sensor 45. A battery 50 as a power supply is connected to the drive device control unit 1. Although a detailed description of the structure of the noise filter 35 is herein omitted, the noise filter 35 functions to remove a power supply noise. The drive device control unit 1 steps up a voltage of the battery 50 and coverts a direct current of the battery 50 to a three-phase alternating current of a predetermined frequency. The drive device control unit 1 supplies the three-phase alternating current to the motor M to control the driving state of the motor M. The drive device control unit 1 also controls the driving state of the generator G and converts an alternating current generated by the generator G to a direct current. The drive device control unit 1 supplies the alternating current to the battery 50 to accumulate electric power. Alternatively, after converting the alternating current generated by the generator G to a direct current, the drive device control unit 1 further converts the direct current to a three-phase alternating current of a predetermined frequency and supplies the three-phase alternating current to the motor M. Note that the motor M includes a motor rotation sensor 48 and the generator G includes a generator rotation sensor 49 in order to output a signal indicating a detection value of the respective rotation speed to the control substrate 33.

The first switching element module 31 includes a first inverter unit 51 for driving the motor M, and a first control circuit 53. The first switching element module 31 is formed by integrally resin-molding respective elements and substrates of the first inverter unit 51 and the first control circuit 53, terminals for connecting the elements and the substrates to the outside, and the like. The second switching element module 32 includes the step-up switching unit 41 for stepping up a power supply voltage, a second inverter unit 52 for driving the generator G, and a second control circuit 54. The second switching element module 32 is formed by integrally resin-molding respective elements and substrates of the step-up switching unit 41, the second inverter unit 52, and the second control circuit 54, terminals for connecting the elements and the substrates to the outside, and the like. In the present embodiment, the first inverter unit 51 and the second inverter unit 52 correspond to the inverter 3 for driving the rotational electric machines (the motor M and the generator G) of the present invention. The switching element modules 31, 32 respectively including the first inverter unit 51 and the second inverter unit 52 therefore form the inverter 3.

The first inverter circuit 51 includes as first inverter switching elements 6 a set of a first upper arm element 6A and a first lower arm element 6B which are connected in series with each other. The first inverter circuit 51 herein includes two sets of first inverter switching elements 6, that is, four first inverter-switching elements, for each phase of the motor M (three phases: U phase, V phase, and W phase). In the present embodiment, insulated gate bipolar transistors (IGBTs) are used as the first inverter switching elements 6. An emitter of the first upper arm element 6A and a collector of the first lower arm element 6B of each set are connected to a not shown coil of the respective phase of the motor M. The respective collectors of the first upper arm elements 6A are connected to a high voltage power supply line Lh to which electric power stepped-up by the step-up device 4 described later is supplied. The respective emitters of the first lower arm elements 6B are connected to a ground line Lg connected to a negative electrode terminal of the battery 50. Free wheel diodes 56 are connected in parallel with the respective first inverter switching elements 6. These free wheel diodes 56 are also included in the first inverter unit 51. Note that, instead of the IGBTs, power transistors of various structures such as bipolar, field effect, and MOS power transistors can be used as the first inverter switching elements 6.

The first inverter unit 51 is electrically connected to the control substrate 33 through the first control circuit 53. A plurality of first inverter switching elements 6 operates according to a motor gate signal output from a motor control unit MCU included in the control substrate 33. The first inverter unit 51 thus converts direct-current (DC) power stepped up by the step-up device 4 to three-phase alternating-current (AC) power having a predetermined frequency and a predetermined current value, and supplies the three-phase AC power to the motor M. As a result, the motor M is driven at a predetermined torque and a predetermined rotation speed. The amount of current flowing between the first inverter unit 51 and the coil of each phase of the motor M is detected by the first current sensor 44 provided between the first inverter unit 51 and the motor M. The detection value of the first current sensor 44 is supplied to the motor control unit MCU included in the control substrate 33.

The second inverter unit 52 includes as second inverter switching elements 7 a set of a second upper arm element 7A and a second lower arm element 7B that are connected in series with each other. The second inverter unit 52 herein includes a set of second inverter switching elements 7, that is, two second inverter switching elements 7, for each phase of the generator G (three phases: U phase, V phase, and W phase). In the present embodiment, insulated gate bipolar transistors (IGBTs) are used as the second inverter switching elements 7. An emitter of the second upper arm element 7A and a collector of the second lower arm element 7B of each set are connected to a not shown coil of the respective phase of the generator G. The respective collectors of the second upper arm elements 7A are connected to the high voltage power supply line Lh. The respective emitters of the second lower arm elements 7B are connected to the ground line Lg connected to the negative electrode terminal of the battery 50. Free wheel diodes 57 are connected in parallel with the respective second inverter switching elements 7. These free wheel diodes 57 are also included in the second inverter unit 52. Note that, instead of the IGBTs, power transistors of various structures such as bipolar, field effect, and MOS power transistors can be used as the second inverter switching elements 7.

The second inverter unit 52 is electrically connected to the control substrate 33 through the second control circuit 54. A plurality of second inverter switching elements 7 operate according to a generator gate signal output from a generator control unit GCU included in the control substrate 33. The second inverter unit 52 thus converts three-phase AC power generated by the generator G to DC power and supplies the DC power to the battery 50 or the first inverter unit 51. The second inverter unit 52 controls the rotation speed and the output torque of the generator G by controlling a value of current flowing through the coil of each phase of the generator G. The amount of current flowing between the second inverter unit 52 and the coil of each phase of the generator G is detected by the second current sensor 45 provided between the second inverter unit 52 and the generator G. The detection value of the second current sensor 45 is supplied to the generator control unit GCU included in the control substrate 33.

The step-up switching unit 41 includes as step-up switching elements 8 a set of a step-up upper arm element 8A and a step-up lower arm element 8B that are connected in series with each other. The step-up switching unit 41 herein includes two sets of step-up switching elements 8, which is, four step-up switching elements 8. In the present embodiment, insulated gate bipolar transistors (IGBTs) are used as the step-up switching elements 8. An emitter of the step-up upper arm element 8A and a collector of the step-up lower arm element 8B of each set are connected to a positive electrode terminal of the battery 50 through the reactor 43. The respective collectors of the step-up upper arm elements 8A are connected to the high voltage power supply line Lh to which electric power stepped-up by the step-up device 4 is supplied. The respective emitters of the step-up lower arm elements 8B are connected to the ground line Lg connected to the negative electrode terminal of the battery 50. Free wheel diodes 47 are connected in parallel with the respective step-up switching elements 8. These free wheel diodes 47 are also included in the step-up switching unit 41. Note that, instead of the IGBTs, power transistors of various structures such as bipolar, field effect, and MOS power transistors can be used as the step-up switching elements 8.

The step-up switching unit 41 is electrically connected to the control substrate 33 through the second control circuit 54. A plurality of step-up switching elements 8 operate according to a step-up gate signal output from a transaxle control unit TCU included in the control substrate 33. The step-up switching unit 41 thus steps up a voltage of the battery 50 to a predetermined voltage and supplies the predetermined voltage to the first inverter unit 51. In the case where the step-up switching unit 41 receives electric power from the generator G, the plurality of step-up switching elements 8 step down a voltage generated by the generator G to a predetermined voltage and supplies the predetermined voltage to the battery 50. The step-up capacitor 42 is connected in parallel with the battery 50 through the noise filter 35. The step-up capacitor 42 functions to smooth the voltage of the battery 50 in order to supply the smoothed DC voltage to the step-up switching unit 41. The step-up switching unit 41 including the step-up switching elements 8, the step-up capacitor 42, and the reactor 43 thus form the step-up device 4.

The smoothing capacitor 34 is connected between the high voltage power supply line Lh to which electric power stepped up by the step-up device 4 is supplied and the ground line Lg connected to the negative electrode terminal of the battery 50. The smoothing capacitor 34 functions to smooth the DC voltage stepped up by the step-up device 4 to supply the smoothed DC voltage mainly to the first inverter unit 51. The discharging resistor 55 is connected in parallel with the smoothing capacitor 34. The discharging resistor 55 functions to discharge charges accumulated in the smoothing capacitor 34 when the power supply is off or the like.

The control substrate 33 is a substrate on which control circuitry for controlling the drive device 2 is formed. In the present embodiment, the control substrate 33 has a control circuit for controlling the first inverter unit 51 and the second inverter unit 52 which are provided as the inverter 3. The control substrate 33 thus controls driving of the motor M and the generator G through the inverter units 51, 52. The control substrate 33 also has a control circuit for controlling the step-up switching unit 41. The control substrate 33 includes the transaxle control unit TCU, the motor control unit MCU, and the generator control unit GCU for the respective functions. The transaxle control unit TCU is a control unit for generally controlling the drive device 2. A detection value of a power supply voltage (pre-step-up voltage) before being stepped up by the step-up device 4 and a detection value of a voltage (stepped-up voltage) after being stepped up by the step-up device 4 are applied to the transaxle control unit TCU through the first control circuit 53. The transaxle control unit TCU also receives and outputs various kinds of information such as an accelerator operating amount, a brake operating amount, and a vehicle speed from and to a vehicle-side control device including the drive unit 2 through a communication section such as a controller area network (CAN). Based on the information, the transaxle control unit TCU generates respective operation commands for the motor control unit MCU and the generator control unit GCU and outputs the operation commands. The transaxle control unit TCU generates a step-up gate signal as a drive signal for driving each step-up switching element 8 of the step-up switching unit 41 and outputs the step-up gate signal to the second control circuit 54.

The operation commands that are output from the transaxle control unit TCU to the motor control unit MCU and the generator control unit GCU are command values of the rotation speed and the output torque of the motor M and the generator G. The amount of current flowing between the first inverter unit 51 and the coil of each phase of the motor M is detected by the first current sensor 44 and the rotation speed of the motor M is detected by the motor rotation sensor 48. These detection values are applied to the motor control unit MCU. Based on these detection values and the operation command from the transaxle control unit TCU, the motor control unit MCU generates a motor gate signal as a drive signal for driving the first inverter switching elements 6 of the first inverter unit 51, and outputs the motor gate signal to the first control circuit 53. Similarly, the amount of current flowing between the second inverter unit 52 and the coil of each phase of the generator G is detected by the second current sensor 45 and the rotation speed of the generator G is detected by the generator rotation sensor 49. These detection values are applied to the generator control unit GCU. Based on these detection values and the operation command from the transaxle control unit TCU, the generator control unit GCU generates a generator gate signal as a drive signal for driving the second inverter switching elements 7 of the second inverter unit 52 and outputs the generator gate signal to the second control circuit 54.

4. Detailed Structure of a Main Part of the Drive Device Control Unit

Figure 6:
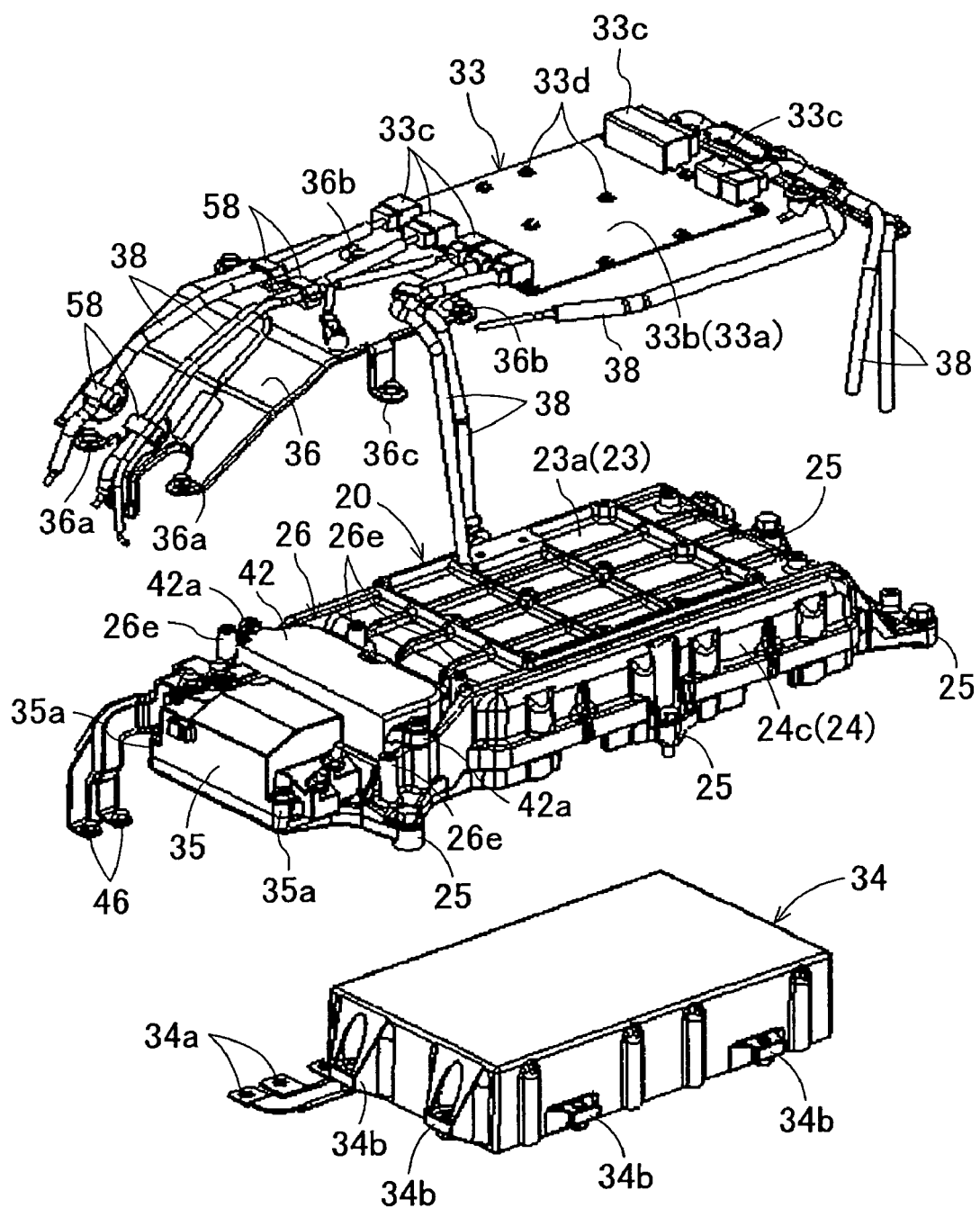
FIG. 6 is an exploded perspective view showing a main part of the drive device control unit.

A detailed structure of a main part of the drive device control unit 1 according to the present embodiment will next be described. As shown in FIGS. 1, 6, and 7, the drive device control unit 1 includes the support bracket 20 as the second base. The support bracket 20 is supported by the case frame 10 as the first base and has the smoothing capacitor 34 fixed thereto. The control substrate 33 is fixed to the opposite surface (the top surface on the cover 39 side) of the support bracket 20 to the surface (the bottom surface on the case frame 10 side) to which the smoothing capacitor 34 is fixed. The drive device control unit 1 is characterized by an arrangement of the parts such as the smoothing capacitor 34 and the control substrate 33 with respect to the support bracket 20. Hereinafter, the structure of the parts provided around the support bracket 20 will be described in detail.

As shown in FIG. 1, the support bracket 20 is supported by the case frame 10. In the present embodiment, a plurality of mounting/attaching portions 14 (six in the illustrated example) are provided along the inner surface of the peripheral wall portion 12 of the case frame 10. The mounting/attaching portions 14 have a cylindrical shape with a bolt hole formed in its axial center, and are formed so as to be provided in contact with the inner surface of the peripheral wall portion 12. Respective mounting surfaces (top surfaces) of the mounting/attaching portions 14 are located at a position slightly lower than the upper end face 12a of the peripheral wall portion 12. On the other hand, fastening portions 25 are respectively provided at a plurality of positions (six in the illustrated example) on a peripheral edge of the support bracket 20 so as to correspond to the positions of the mounting/attaching portions 14 of the case frame 10. The fastening portions 25 have a boss shape having a bolt insertion hole formed in the middle, and are formed so as to protrude slightly from the peripheral edge of the support bracket 20. The support bracket 20 is fixedly fastened to the case frame 10 at the fastening portions 25 by inserting bolts into the bolt insertion holes of the fastening portions 25 and then fastening the bolts in the bolt holes of the mounting/attaching portions 14, respectively.

As shown in FIGS. 8 and 9, the support bracket 20 has the first box-shaped portion 21 which is open toward the case frame 10 (toward the bottom surface), and the second box-shaped portion 26 which is provided adjacent to the first box-shaped portion 21 on one side of the longitudinal direction of the support bracket 20 and which is open toward the cover 39 (toward the top surface) in the opposite direction to the opening direction of the first box-shaped portion 21. In the present embodiment, as shown in FIG. 7, the support bracket 20 further has a third box-shaped portion 28 which is provided adjacent to the first box-shaped portion 21 on the other side of the longitudinal direction of the support bracket 20 and which is open toward the cover 39 (toward the top surface) in the opposite direction to the opening direction of the first box-shaped portion 21. The first box-shaped portion 21 has the opening 22 that is open toward the case frame 10 (toward the bottom surface), the bottom portion 23 having an approximately flat plate shape, and the peripheral wall portion 24 that is provided so as to surround the peripheral edge of the bottom portion 23. The bottom portion 23 herein has an approximately rectangular planar shape. The first box-shaped portion 21 therefore has an approximately rectangular parallelepiped box shape that is open at its bottom surface. As shown in FIG. 9, the first box-shaped portion 21 has an inner space of an approximately rectangular parallelepiped box shape surrounded by the peripheral wall portion 24. The peripheral wall portion 24 has a first partition wall portion 24a provided on one side of the longitudinal direction of the support bracket 20 and functioning also as a partition wall separating the first box-shaped portion 21 and the second box-shaped portion 26 from each other, a second partition wall portion 24b on the other side of the longitudinal direction of the support bracket 20 and functioning also as a partition wall separating the first box-shaped portion 21 and the third box-shaped portion 28 from each other, a first sidewall portion 24c provided on one side of a width direction of the support bracket 20, and a second sidewall portion 24d provided on the other side of the width direction of the support bracket 20.

In the support bracket 20, a plurality of capacitor attaching portions 21a (eight in the illustrated example) for fixing the smoothing capacitor 34 are provided along the peripheral wall portion 24 defining the first box-shaped portion 21. Two capacitor attaching portions 21a are provided in each wall of the peripheral wall portion 24. The capacitor attaching portions 21a formed along the first partition wall portion 24a and the second partition wall portion 24b are different in structure from the capacitor attaching portions 21a formed along the first sidewall portion 24c and the second sidewall portion 24d. In other words, as shown in FIG. 9, the capacitor attaching portions 21a formed along the first partition wall portion 24a and the second partition wall portion 24b have a cylindrical shape having a bolt hole formed in its axial center, and are formed so as to be provided in contact with the inner surface of the first partition wall portion 24a or the second partition wall portion 24b. The capacitor attaching portions 21a formed along the first sidewall portion 24c and the second sidewall portion 24d have a boss shape having a bolt hole formed in the middle, and are formed so as to protrude slightly laterally (in the width direction of the support bracket 20) from the first sidewall portion 24c or the second sidewall portion 24d. These capacitor attaching portions 21a are provided so that an attaching surface (bottom surface) of each capacitor attaching portion 21a to which the smoothing capacitor 34 is attached is located at a position slightly higher than a lower end face 24e of the peripheral wall portion 24, that is, at a position located closer to the bottom surface 23 (a lower position in FIG. 9) than the lower end face 24e of the peripheral wall portion 24.

As shown in FIGS. 6, 7, and 9, the smoothing capacitor 34 is fixedly accommodated in the first box-shaped portion 21 from the case frame 10 side (the lower side) of the support bracket 20. The smoothing capacitor 34 has an approximately rectangular parallelepiped shape. The first box-shaped portion 21 has an internal space of the approximately rectangular parallelepiped shape as described above so as to appropriately accommodate the smoothing capacitor 34. The inner space is sized so as to correspond to the shape of the smoothing capacitor 34. The smoothing capacitor 34 has fastening portions 34b at a plurality of positions (eight in the illustrated example) on its peripheral edge so that the fastening portions 34b are located corresponding to the positions of the capacitor attaching portions 21a of the first box-shaped portion 21. Each fastening portion 34b has an approximately rectangular parallelepiped shape extending laterally from a corresponding sidewall of the smoothing capacitor 34, and has a bolt insertion hole in the middle. The smoothing capacitor 34 is fixedly fastened to the support bracket 20 at the fastening portions 34b by inserting bolts into the bolt insertion holes of the fastening portions 34b and then fastening the bolts in the bolt holes of the capacitor attaching portions 21a, respectively. The smoothing capacitor 34 includes the connection terminals 34a protruding to the outside from the opening 22 when the smoothing capacitor 34 is accommodated in the first box-shaped portion 21. The connection terminals 34a are provided so as to protrude from the opening 22 in a lateral direction of the support bracket 20 in parallel with the bottom surface of the smoothing capacitor 34. In the illustrated example, the connection terminals 34a are provided on only one side of a width direction of the smoothing capacitor 34. In order to allow the connection terminals 34a to protrude from the support bracket 20, the second sidewall portion 24d provided on the connection terminal 34a side of the peripheral wall portion 24 is located at a position slightly higher (lower in FIG. 9) than that of the lower end face 24e at positions corresponding to the connection terminals 34a, like the capacitor attaching portions 21a.

As shown in FIGS. 6 through 8, the bottom portion 23 of the first box-shaped portion 21 in the support bracket 20 has a flat plate shape having an approximately rectangular planar shape. The outer surface 23a on the cover 39 side of the bottom portion 23 serves as a substrate-attaching surface for fixing the control substrate 33 thereto, and has a plurality of substrate attaching portions 23b. The outer surface 23a of the bottom portion 23 of the first box-shaped portion 21 has a larger plane than that of the planar shape of the control substrate 33. Preferably, the outer surface 23a has the substrate attaching portions 23b provided at a plurality of positions on a peripheral edge of the control substrate 33 and at least one position located closer to the middle of the control substrate 33 than the plurality of positions. In the illustrated example, the substrate attaching portions 23b are provided in four rows in a longitudinal direction of the control substrate 33, that is, in the longitudinal direction of the support bracket 20, and in three rows in a width direction of the control substrate 33, that is, in the width direction of the support bracket 20. The substrate attaching portions 23b are therefore provided at twelve positions in total, that is, ten positions on the peripheral edge of the control substrate 33 and two positions located closer to the middle of the control substrate 33 than the ten positions. In order to achieve an improved heat dissipation property, a reduced weight, and an improved rigidity, a plurality of ribs 23c is formed on the outer surface 23a of the bottom portion 23 so as to extend along the longitudinal direction and the width direction of the support bracket 20. In the present embodiment, the substrate attaching portions 23b are provided at intersections of the ribs 23c. The substrate attaching portions 23b basically have a boss shape having a bolthole in the middle. Note that, in the illustrated example, a part of the support bracket 20 has a structure having two bolt holes of two substrate-attaching portions 23b are collectively formed in one platform-like portion 23e. Of the ribs 23c, those located at positions corresponding to the substrate attaching portions 23b and the peripheral edge of the control substrate 33 are used as support ribs 23d. The height of the support ribs 23d from the bottom portion 23 is higher than that of the ribs 23c located at the other positions. The plurality of substrate attaching portions 23b and support ribs 23d have their respective upper end faces in contact with a bottom surface of the control substrate 33 and thus function to support the control substrate 33 from beneath.

As shown in FIGS. 6 and 7, the control substrate 33 is fixed to the outer surface 23a, that is, the cover 39 side surface, of the bottom portion 23 of the first box-shaped portion 21 in the support bracket 20. As described above, the smoothing capacitor 34 is fixedly accommodated in the first box-shaped portion 21 from the case frame 10 side (the lower side) of the support bracket 20. The control substrate 33 is therefore fixed to the opposite surface to the surface having the smoothing capacitor 34 fixed thereto, with the support bracket 20 interposed there between. The control substrate 33 has a flat-plate like substrate main body 33a, and connectors 33c provided on a front surface 33b (top surface) of the substrate main body 33a, and various electronic parts (see FIG. 10) provided on the front surface 33b and a back surface (bottom surface) of the substrate main body 33a. A plurality of connectors 33c are provided along the edges on one side and the other side of the longitudinal direction of the control substrate 33 (the longitudinal direction of the support bracket 20).

The substrate main body 33a of the control substrate 33 has fastening portions 33d provided at a plurality of positions on a peripheral edge of the substrate main body 33a and at least one position located closer to the middle of the substrate main body 33a than the plurality of positions. The fastening portions 33d are thus provided corresponding to the positions of the substrate attaching portions 23b of the support bracket 20. Like the substrate attaching portions 23b, in the illustrated example, the fastening portions 33d are provided in four rows in the longitudinal direction of the control substrate 33, that is, in the longitudinal direction of the support bracket 20, and in three rows in the width direction of the control substrate 33, that is, in the width direction of the support bracket 20. The fastening portions 33d are therefore provided at twelve positions in total, that is, ten positions on the peripheral edge of the control substrate 33 and two positions located closer to the middle of the control substrate 33 than the ten positions. Each fastening portion 33d is formed by a bolt insertion hole formed in the substrate main body 33a. The control substrate 33 is fixedly fastened to the support bracket 20 at the fastening portions 33d by inserting bolts into the bolt insertion holes of the fastening portions 33d and then fastening the bolts in the bolt holes of the substrate attaching portions 23b, respectively. Providing the fastening portions 33d not only in the peripheral edge of the control substrate 33 but also in the middle region of the control substrate 33 suppresses bending in the middle region of the control substrate 33, whereby vibration resistance of the control substrate 33 can be assured.

Figure 10:
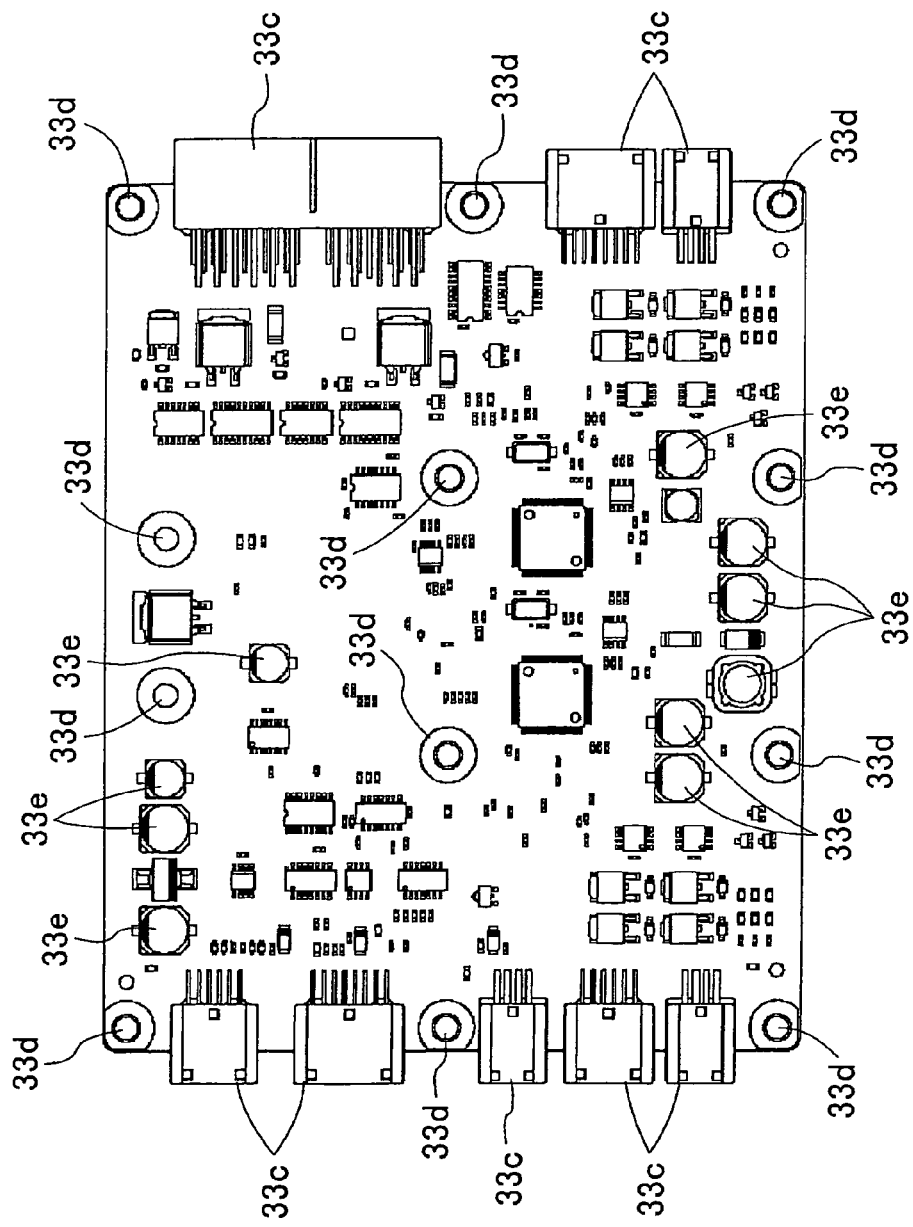
FIG. 10 is a diagram showing an arrangement of parts on a control substrate.

As shown in FIG. 10, various electronic parts are arranged on the surface of the substrate main body 33a of the control substrate 33. Of the plurality of electronic parts, heavy parts 33e having a predetermined weight or more are provided in the vicinity of the fastening portions 33d. Such heavy parts 33e include, for example, a transformer and a capacitor. This structure enables the weight of the heavy parts 33e to be supported by the substrate attaching portions 23b to which the fastening portions 33d are fixedly fastened. This suppresses bending of the substrate surface 33 at the positions where the heavy parts 33e are provided, whereby vibration resistance of the control resistance 33 can be improved.

As shown in FIG. 8, the second box-shaped portion 26 of the support bracket 20 is a box-shaped portion which is provided adjacent to the first box-shaped portion 21 and which is open toward the cover 39 (toward the top surface) in the opposite direction to the opening direction of the first box-shaped portion 21. The second box-shaped portion 26 has the opening 26a that is open toward the cover 39 (toward the top surface), a bottom portion 26b having an approximately flat plate shape, and a peripheral wall portion 26c that is provided so as to surround a peripheral edge of the bottom portion 26b. The opening 26a is open at a top surface slightly tilted so that one side of the longitudinal direction of the support bracket 20 becomes lower. The bottom portion 26b has an approximately rectangular planar shape. The second box-shaped portion 26 therefore has a box shape having its tilted top surface opened, and has an inner space surrounded by the peripheral wall portion 26c. The peripheral wall portion 26c is shared with the first partition wall 24a on the other side of the longitudinal direction of the support bracket 20. The peripheral wall portion 26c has a partition wall separating a filter mounting surface 27 described later and the second box-shaped portion 26 from each other on one side of the longitudinal direction of the support bracket 20, and sidewalls provided on both sides of the width direction of the support bracket 20 and having a tilted top surface.

As shown in FIGS. 6 and 7, the step-up capacitor 42 is fixedly accommodated in the second box-shaped portion 26. As shown in FIG. 8, the second box-shaped portion 26 therefore has a capacitor attaching portion 26d for fixing the step-up capacitor 42. A plurality of capacitor attaching portions 26d is herein provided. More specifically, three capacitor attaching portions 26d are provided in total, that is, one in the bottom portion 26b of the second box-shaped portion 26 and one in each of the two sidewalls of the peripheral wall portion 26c. Each capacitor attaching portion 26d has a boss shape having a bolthole formed in the middle. The step-up capacitor 42 has an approximately rectangular parallelepiped shape accommodated in the second box-shaped portion 26. The step-up capacitor 42 has fastening portions 42a provided at a plurality of positions (three in the illustrated example) so as to correspond to the positions of the capacitor attaching portions 26d of the second box-shaped portion 26, respectively. Each fastening portion 42a has a bolt insertion hole. The step-up capacitor 42 is fixedly fastened to the support bracket 20 at the fastening portions 42a by inserting bolts into the bolt insertion holes of the fastening portions 42a and then fastening the bolts in the bolt holes of the capacitor attaching portions 26d, respectively.

As shown in FIG. 8, the support bracket 20 has the filter mounting surface 27 for fixing the noise filter 35 thereto. The filter-mounting surface 27 is provided adjacent to the second box-shaped portion 26 on one side of the longitudinal direction of the support bracket 20. The filter mounting surface 27 has an approximately flat plate shape extending from the second box-shaped portion 26 to one side of the longitudinal direction of the support bracket 20. The noise filter 35 is thus fixed to the opposite side of the step-up capacitor 42 accommodated in the second box-shaped portion 26 to the first box-shaped portion 21. The filter-mounting surface 27 has filter attaching portions 27a for fixing the noise filter 35. The filter attaching portions 27a are herein formed by bolt holes formed at a plurality of positions (three in the illustrated example) of the filter-mounting surface 27, respectively. As shown in FIG. 6, the noise filter 35 has fastening portions 35a provided at a plurality of positions (three in the illustrated example) so as to correspond to the positions of the filter attaching portions 27a, respectively. Each fastening portion 35a has a bolt insertion hole. The noise filter 35 is fixedly fastened to the support bracket 20 at the fastening portions 35a by inserting bolts in the bolt insertion holes of the fastening portions 35a and then fastening the bolts in the bolt holes of the filter attaching portions 27a, respectively.

As shown in FIG. 7, the third box-shaped portion 28 of the support bracket 20 is a box-shaped portion which is provided adjacent to the first box-shaped portion 21 on the opposite side to the second box-shaped portion 26 and which is open toward the cover 39 (toward the top surface) in the opposite direction to the opening direction of the first box-shaped portion 21. The third box-shaped portion 28 has an opening that is open toward the cover 39 (toward the top surface), a bottom portion 28b having an approximately flat plate shape, and a peripheral wall portion 28c that is provided so as to surround the bottom portion 28b. In the illustrated example, the third box-shaped portion 28 has an inner space having an approximately triangular prism shape. The opening is therefore open at a top surface slightly tilted so that the other side of the longitudinal direction of the support bracket 20 becomes lower. The bottom portion 28b has an approximately rectangular planar shape. The peripheral wall portion 28c is shared with the second partition wall 24b on one side of the longitudinal direction of the support bracket 20. The peripheral wall portion 28c has approximately triangular sidewalls provided on both sides of the width direction of the support bracket 20 and having a tilted top surface. The discharging resistor 55 is fixedly accommodated in the third box-shaped portion 28.

As shown in FIGS. 1, 2, and 6, the first wiring bracket 36 as a cover member is fixed to the support bracket 20 so as to cover the opening of the second box-shaped portion 26. The first wiring bracket 36 is made of a metal material such as aluminum, and is manufactured by sheet metal working or the like. The first wiring bracket 36 has a plate shape having approximately the same width as that of the support bracket 20. The first wiring bracket 36 is shaped so as to entirely cover the respective top surfaces of the step-up capacitor 42 accommodated in the second box-shaped portion 26 and the noise filter 35 mounted adjacent to the step-up capacitor 42. The first wiring bracket 36 thus forms a surface tilted along the shape of the respective top surfaces of the step-up capacitor 42 and the noise filter 35 so as to extend in the direction toward the case frame 10 (in a downward direction) toward the end of the support bracket 20. Preferably, the first wiring bracket 36 has a shape that does not have any opening or a shape that has a small number of openings in order to block electromagnetic noise generated from the step-up capacitor 42 and the noise filter 35 and thus prevent the electromagnetic noise from affecting the control substrate 33 and cables connected to the control substrate 33.

The first wiring bracket 36 includes fastening portions 36a provided at two positions at its one end of a longitudinal direction of the first wiring bracket 36 (the longitudinal direction of the support bracket 20), and fastening portions 36b provided at two positions at the other end of the longitudinal direction of the first wiring bracket 36. The first wiring bracket 36 further includes fastening portions 36c provided at two positions in an intermediate part of the longitudinal direction of the first wiring bracket 36. The fastening portions 36a provided on one side of the longitudinal direction are fixedly fastened to bracket attaching portions 43a (see FIG. 1) provided in the reactor 43, respectively. The fastening portions 36b provided on the other side of the longitudinal direction and the fastening portions 36c provided in the intermediate part of the longitudinal direction are fixedly fastened to bracket attaching portions 26e provided along the peripheral wall portion 26c of the second box-shaped portion 26 of the support bracket 20, respectively. Each fastening portion 36a through 36c has a bolt insertion hole, and each bracket attaching portion 43a, 26e has a bolthole. As shown in FIG. 2, the first wiring bracket 36 is fixedly fastened to the support bracket 20 and the case frame 10 by inserting bolts into the bolt insertion holes of the fastening portions 36a through 36c and then fastening the bolts in the bolt holes of the bracket attaching portions 43a, 26e, respectively.

As shown in FIGS. 2 and 7, the second wiring bracket 37 is provided adjacent to the control substrate 33 on the opposite side to the first wiring bracket 36 and is fixed to the support bracket 20 so as to cover the third box-shaped portion 28. Like the first wiring bracket 36, the second wiring bracket 37 is made of a metal material such as aluminum and is manufactured by sheet metal working or the like. The second wiring bracket 37 has a plate shape having approximately the same width as that of the support bracket 20 and is shaped so as to cover the top surface of the third box-shaped portion 28. The second wiring bracket 37 thus forms a surface tilted along the shape of the top surface of the third box-shaped portion 28 so as to extend in the direction toward the case frame 10 (in a downward direction) toward the end of the support bracket 20. Note that electromagnetic noise is hardly generated from the discharging resistor 55 accommodated in the third box-shaped portion 28. Unlike the first wiring bracket 36, the second wiring bracket 37 therefore does not need to block electromagnetic noise. Accordingly, an opening 37a is formed in the second wiring bracket 37 in order to reduce the weight.

The second wiring bracket 37 includes fastening portions 37b provided at two positions at its one end of a longitudinal direction of the second wiring bracket 37 (the longitudinal direction of the support bracket 20), and fastening portions 37c provided at two positions at the other end of the longitudinal direction of the first wiring bracket 36. The fastening portions 37b, 37c are fixedly fastened to bracket attaching portions 28a provided in the third box-shaped portion 28 of the support bracket 20, respectively. Each fastening portion 37b, 37c has a bolt insertion hole, and each bracket attaching portion 28a has a bolthole. The second wiring bracket 37 is fixedly fastened to the support bracket 20 by inserting bolts into the bolt insertion holes of the fastening portions 37b, 37c and then fastening the bolts in the bolt holes of the bracket attaching portions 28a, respectively.

The cables 38 that are connected to the control substrate 33 are fixed to the first wiring bracket 36 and the second wiring bracket 37. The clamp members 58 are fixed at a plurality of positions on the respective top surfaces of the first wiring bracket 36 and the second wiring bracket 37. Each cable 38 is fixed to the first wiring bracket 36 or the second wiring bracket 37 through a corresponding clamp member 58. The cables 38 are herein wiring cables for electrically connecting each part such as the drive device control unit 1, the drive device 2 having the drive device control unit 1 mounted thereon, and a vehicle having the drive device 2 mounted thereon to the control substrate 2. Each cable 38 therefore has its one end connected to a corresponding connector 33c of the control substrate 33. Although not shown in the figures, the other end of each cable 38 is connected to a vehicle-side control device or the like through, for example, the current sensors 44, 45, rotation sensors 72, 73, and a coil temperature sensor for detecting an operating state of the switching element modules 31, 32, the motor M, and the generator G, and a communication section such as a controller area network (CAN). Suppressing the influence of electromagnetic noise is especially required for the cables 38 for receiving and outputting an electric signal indicating various kinds of information. Note that a power supply cable connected to the battery 50 to supply electric power to the control substrate 33 is also included in the cables 38.

Figure 11:
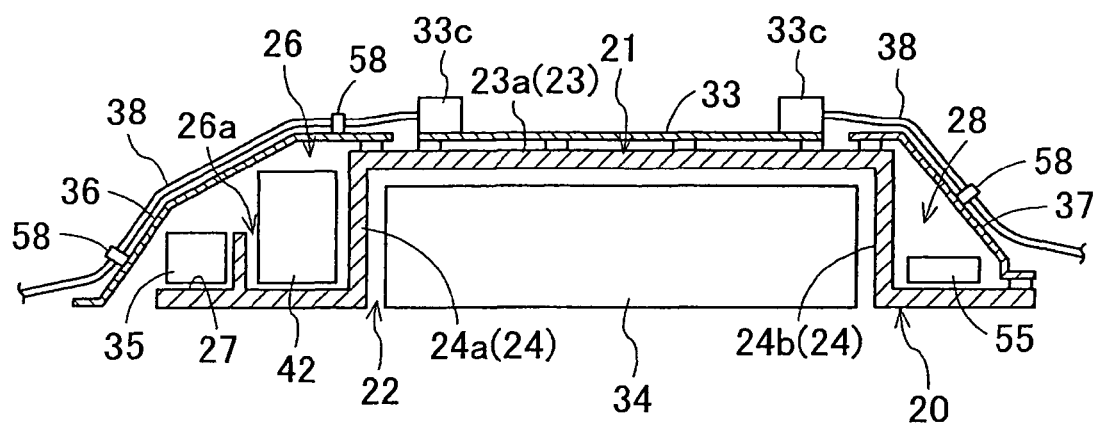
FIG. 11 is a schematic cross-sectional view showing an arrangement of parts with respect to the support bracket.

With the above structure, each part is arranged with respect to the support bracket 20 as shown in a schematic cross-sectional view of FIG. 11. More specifically, the smoothing capacitor 34 is fixedly accommodated in the first box-shaped portion 21 that is open toward the case frame 10 (toward the bottom surface). The control substrate 33 is fixed to the outer surface 23a of the cover 39 side of the bottom portion 23 of the first box-shaped portion 21. The control substrate 33 is thus fixed to the opposite surface to the surface having the smoothing capacitor 34 fixed thereto, with the support bracket 20 interposed there between. The step-up capacitor 42 is fixedly accommodated in the second box-shaped portion 26 which is provided adjacent to the first box-shaped portion 21 and which is open toward the cover 39 (toward the top surface) in the opposite direction to the opening direction of the first box-shaped portion 21. The noise filter 35 is fixed to the filter mounting surface 27 provided adjacent to the second box-shaped portion 26 on the opposite side to the first box-shaped portion 21. The first wiring bracket 36 is fixedly mounted so as to entirely cover the respective top surfaces of the step-up capacitor 42 and the noise filter 35. The cables 38 each having its one end connected to the control substrate 33 are fixed to the top surface of the first wiring bracket 36. The discharging resistor 55 is fixedly accommodated in the third box-shaped portion 28 which is provided adjacent to the first box-shaped portion 21 on the opposite side to the second box-shaped portion 26 and which is open toward the cover 39 (toward the top surface) in the opposite direction to the opening direction of the first box-shaped portion 21. The second wiring bracket 37 is fixedly mounted so as to cover the top surface of the third box-shaped portion 28. The cables 38 each having its one end connected to the control substrate 33 are fixed to the top surface of the second wiring bracket 37.

As described above, since the support bracket 20 is structured to include the first box-shaped portion 21 and the second box-shaped portion 26 which are open in different directions from each other, each box-shaped portion is reduced in size and the partition wall separating the two box-shaped portions from each other functions to reinforce the support bracket 20. Reduction in weight of the support bracket 20 is thus implemented while assuring the rigidity. The outer surface 23a of the bottom surface 23 of the first box-shaped portion 21 that accommodates the smoothing capacitor 34 larger than other circuit components of the drive device control unit 1 has an approximately flat plate shape having a larger plane than the planar shape of the control substrate 33. Since the control substrate 33 is structured to be fixed to the outer surface 23a of the bottom portion 23 of the first box-shaped portion 21, a required number of fixing portions of the control substrate 33 can be assured at appropriate positions. As a result, vibration resistance of the control substrate 33 is ensured. Moreover, since the smoothing capacitor 34 is accommodated in the first box-shaped portion 21 and the control substrate 33 is fixed to the outer surface 23a of the bottom portion 23 on the opposite side to the smoothing capacitor 34, the support bracket 20 blocks electromagnetic noise generated from the smoothing capacitor 34, thereby preventing the electromagnetic noise from affecting the control substrate 33.

The noise filter 35 is mounted adjacent to the step-up capacitor 42 accommodated in the second box-shaped portion 26 so as to be located on the opposite side of the step-up capacitor 42 to the first box-shaped portion 21. The step-up capacitor 42 that is heavier than the noise filter 35 is thus mounted on the side of the first box-shaped portion 21 having a high rigidity. This structure suppresses bending near the second box-shaped portion 26 in the support bracket 20 and reduces vibration of the noise filter 35 and the step-up capacitor 42, thereby improving vibration resistance of the noise filter 35 and the step-up capacitor 42. Moreover, the first wiring bracket 36 is mounted so as to entirely cover the respective top surfaces of the step-up capacitor 42 and the noise filter 35, and the cables 38 connected to the control substrate 33 are fixed to the top surface of the first wiring bracket 36. The first wiring bracket 36 and the support bracket 20 thus block electromagnetic noise generated from the noise filter 35 and the step-up capacitor 42, thereby preventing the electromagnetic noise from affecting the control substrate 33 and the cables 38. Since the first wiring bracket 36 functions both as a shield for blocking the electromagnetic noise and as a bracket for fixing the cables 38, the number of parts is reduced, whereby reduction in size and weight of the drive device control unit 1 is implemented. Note that electromagnetic noise is hardly generated from the discharging resistor 55 as described above. Accordingly, the second wiring bracket 37 does not need to block the electromagnetic noise and therefore functions merely as a bracket for fixing the cables 38.

5. Second Embodiment

Figure 12:
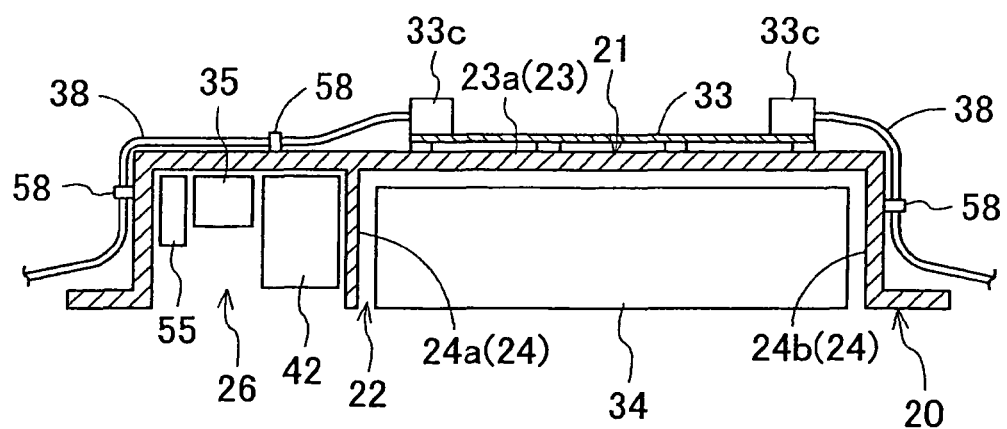
FIG. 12 is a schematic cross-sectional view showing an arrangement of parts with respect to a support bracket according to a second embodiment of the present invention.

A second embodiment of the present invention will next be described. FIG. 12 is a schematic cross-sectional view showing arrangement of each part with respect to a support bracket 20 of a drive device control unit 1 according to the present embodiment. In the example shown in the figure, a smoothing capacitor 34 is fixedly accommodated in a first box-shaped portion 21 that is open toward the case frame 10 (toward the bottom surface). A control substrate 33 is fixed to an outer surface 23a located on the cover 39 side of a bottom portion 23 of the first box-shaped portion 21. The control substrate 33 is therefore fixed to the opposite surface to the surface having the smoothing capacitor 34 fixed thereto, with the support bracket 20 interposed there between. This structure is the same as that of the above embodiment. A second box-shaped portion 26 of the support bracket 20, however, is different from that of the above embodiment. More specifically, the support bracket 20 has the second box-shaped portion 26 provided adjacent to the first box-shaped portion 21. Like the first box-shaped portion 21, the second box-shaped portion 26 is open toward the case frame 10 (toward the bottom surface). A step-up capacitor 42 is fixedly accommodated in the second box-shaped portion 26. In this example, a noise filter 35 and a discharging resistor 55 are also fixedly accommodated in the second box-shaped portion 26.

With this structure, the smoothing capacitor 34, the step-up capacitor 42, and the noise filter 35 are fixed to the case frame 10 side (the bottom surface side) of the support bracket 20, and the control substrate 33 and cables 38 are fixed to the opposite surface to the surface having the smoothing capacitor 34 and the like fixed thereto, with the support bracket 20 interposed there between. Accordingly, only the support bracket 20 blocks electromagnetic noise generated from the smoothing capacitor 34, the step-up capacitor 42, and the noise filter 35, thereby preventing the electromagnetic noise from affecting the control substrate 33 and the cables 38. Since a member such as the first wiring bracket 36 is not required to block the electromagnetic noise, the number of parts can be reduced. As a result, a reduction in the size and weight of the drive device control unit 1 can be implemented.

In this case, the cables 38 are directly fixed to the support bracket 20 by clamp members 58. In this example, a first partition wall 24a as a partition wall separating the first box-shaped portion 21 and the second box-shaped portion 26 from each other functions to reinforce the support bracket 20. Note that a structure that does not have the first partition wall 24a is also possible. Although the differences from the first embodiment have been mainly described above, any structure that has not been described specifically may be the same as that of the first embodiment.

6. Other Embodiments (1) In the above embodiments, description is given to an example in which the support bracket 20 as the second base has the first box-shaped portion 21 having the opening 22 that is open toward the case frame 10 as the first base and the smoothing capacitor 34 is fixedly accommodated in the first box-shaped portion 21. However, embodiments of the present invention are not limited to this, and the shape of the support bracket 20 can be modified as appropriate. Accordingly, for example, the support bracket 20 may have a shape that does not have a box-shaped portion, such as a flat plate shape, and both the smoothing capacitor 34 and the control substrate 33 may be respectively fixed to the opposite surfaces to each other. This structure is also one of the preferred embodiments of the present invention.

(2) In the above embodiments, description is given to an example in which the smoothing capacitor 34 has an approximately rectangular parallelepiped shape. However, embodiments of the present invention are not limited to this. The smoothing capacitor 34 may have another shape such as a cylindrical shape. In this case, the support bracket 20 needs to have a shape corresponding to the shape of the smoothing capacitor 34. Preferably, the support bracket 20 has a planar shape on the surface opposite to the surface having the smoothing capacitor 34 fixed thereto, so that the control substrate 33 can be fixed thereto.

(3) In the above embodiments, description is given to an example in which the drive device control unit 1 includes the step-up device 4 for stepping up a power supply voltage. However, embodiments of the present invention are not limited to this. A structure that does not include the step-up device 4 is also one of preferred embodiments of the present invention. In this case, since the step-up capacitor 42 is not required, the support bracket 20 that does not include the second box-shaped portion 26 may be used.

(4) In the above embodiments, description is given to an example in which the noise filter 35 is fixed to the filter mounting surface 27 provided adjacent to the second box-shaped portion 26. However, embodiments of the present invention are not limited to this. For example, a structure fixedly accommodating both the noise filter 35 and the step-up capacitor 42 in the second box-shaped portion 26 is also one of the preferred embodiments of the present invention.

(5) In the above embodiments, description is given to an example in which the drive device includes two rotating electrical machines, that is, the motor M and the generator G. However, embodiments of the present invention are not limited to this. The number of rotating electrical machines included in the drive device and the respective functions of the rotating electrical machines can be modified as appropriate. For example, a drive device including one or more motor-generators performing both functions of the motor and the generator as required or a drive device including only one motor M or one generator G is also one of the preferred embodiments of the present invention.

(6) In the above embodiments, description is given to an example in which the present invention is applied to the drive device control unit 1 for controlling a hybrid vehicle drive device. However, an applicable range of the present invention is not limited to this. The present invention may be applied in a preferable manner to control units of various kinds of drive devices having a rotating electrical machine for use in, for example, an electric vehicle.

The present invention can be used in a preferable manner in, for example, a drive device control unit for controlling a drive device including a rotating electrical machine for use in an electric vehicle, a hybrid vehicle, and the like.

Note that, in the present application, the term "rotating electrical machine" is used as a concept including a motor (electric motor), a generator (electric generator), and a motor-generator performing both functions of the motor and the generator as required.

According to an exemplary aspect of the invention, the control substrate is also fixed to the second base having the smoothing capacitor fixed thereto. Therefore, a special base for fixing the control substrate thereto is not required. As a result, the number of parts can be reduced as compared to the case where a special base for fixing the control substrate is provided as in the related art, whereby a reduction in the size and weight of the drive device control unit can be achieved. Moreover, the control substrate is fixed to a surface of the second base having the smoothing capacitor fixed thereto. Accordingly, a required number of fixing portions of the control substrate can be easily assured while reliably fixing both the smoothing capacitor and the control substrate. As a result, vibration resistance of each part including the control substrate can be assured.

According to an exemplary aspect of the invention, since the second base has the box-shaped portion, the rigidity of the second base can be easily assured while reducing the weight of the second base. Moreover, since the control substrate is fixed to the outer surface of the bottom portion of the box-shaped portion of the second base and the bottom portion has an approximately flat plate shape, a required number of fixing portions of the control substrate can be very easily assured at appropriate positions. As a result, vibration resistance of the control substrate can be easily assured. Moreover, the smoothing capacitor is accommodated in the first box-shaped portion of the second base and the control substrate is fixed to the outer surface of the first box-shaped portion. Therefore, electromagnetic noise generated from the smoothing capacitor can be blocked by the second base, whereby the electromagnetic noise can be effectively prevented from affecting the control substrate.

According to an exemplary aspect of the invention, bending in the middle of the control substrate can be suppressed, and the control substrate can be appropriately fixedly fastened to the second base. As a result, vibration resistance of the control substrate can be assured.

A structure is preferred in which the smoothing capacitor has an approximately rectangular parallelepiped shape and the first box-shaped portion has an inner space of an approximately rectangular parallelepiped shape corresponding to the shape of the smoothing capacitor.

According to an exemplary aspect of the invention, the shape of the second base can be simplified as compared to the case of using a conventional cylindrical smoothing capacitor. Moreover, the first box-shaped portion has an inner space corresponding to the shape of the smoothing capacitor having an approximately rectangular parallelepiped shape. Therefore, the smoothing capacitor can be appropriately accommodated and fixed in the first box-shaped portion of the second base, and an unnecessary space is reduced, whereby a reduction in size of the drive device control unit can be achieved.

According to an exemplary aspect of the invention, it is not necessary to form a notch or the like in the second base in order to provide wiring to the connection terminal of the smoothing capacitor. Accordingly, the shape of the second base can further be simplified.

According to an exemplary aspect of the invention, in the case where the drive device control unit includes the step-up device, the step-up switching element having a large heat generation amount is fixed to the same surface as that of the switching element module having a large heat generation amount. Therefore, the step-up switching element and the switching element module can be easily cooled by a common cooling circuit. Moreover, the use of such a common cooling circuit enables a reduction in the size and weight of the drive device control unit. Since the relatively heavy reactor is fixed to the first base and the step-up capacitor that is lighter than the reactor is fixed to the second base, the load that is imposed on the second base can be reduced, and the center of gravity can be shifted toward the first base. Accordingly, vibration resistance of the drive device control unit can be improved.

According to an exemplary aspect of the invention, the size of each box-shaped portion can be reduced as compared to the case where both the smoothing capacitor and the step-up capacitor are accommodated in a single box-shaped portion. Moreover, a wall separating the first box-shaped portion and the second box-shaped portion from each other serves to reinforce the second base. Accordingly, a reduction in weight can be easily achieved while assuring rigidity of the second base.

According to an exemplary aspect of the invention, the step-up capacitor heavier than the noise filter is mounted on the side of the first box-shaped portion having a high rigidity. Accordingly, bending near the second box-shaped portion in the second base can be suppressed, and vibration of the noise filter and the step-up capacitor can be reduced. As a result, vibration resistance of the noise filter and the step-up capacitor can be improved.

According to an exemplary aspect of the invention, electromagnetic noise generated from the step-up capacitor accommodated in the second box-shaped portion can be blocked by the cover member and the second base. The electromagnetic noise can therefore be prevented from affecting the control substrate and the cable connected to the control substrate. Moreover, since the cover serves also as a bracket of the cable connected to the control substrate, the number of parts can be reduced, whereby a reduction in size and weight of the drive device control unit can be achieved.

For example, the cable connects the control substrate to the switching element module, a sensor for detecting an operating state of the rotating electrical machine, or each part of a vehicle including the drive device.

What is claimed is:

1. A drive device control unit that controls a drive device including a rotating electrical machine, the drive device control unit comprising:
a control substrate that controls the drive device;
a switching element module that forms an inverter that drives the rotating electrical machine;
a smoothing capacitor that smoothes an input power supply of the inverter;
a first base having the switching element module fixed thereto; and
a second base supported by the first base and having the smoothing capacitor fixed to a first surface of the second base,
wherein the control substrate is fixed to a second surface of the second base opposite to the first surface having the smoothing capacitor fixed thereto.

2. The drive device control unit according to claim 1, wherein:
the second base has a first box-shaped portion having an opening that is open toward the first base and a bottom portion having an approximately flat plate shape, and
the smoothing capacitor is fixedly accommodated in the first box-shaped portion, and the control substrate is fixed to an outer surface of the bottom portion.

3. The drive device control unit according to claim 2, wherein the control substrate is fixedly fastened to the bottom portion at a plurality of positions on a peripheral edge of the control substrate and at least one position closer to a middle of the control substrate than the plurality of positions.

4. The drive device control unit according to claim 2, wherein the smoothing capacitor has an approximately rectangular parallelepiped shape and the first box-shaped portion has an inner space of an approximately rectangular parallelepiped shape corresponding to the shape of the smoothing capacitor.

5. The drive device control unit according to claim 2, wherein the smoothing capacitor includes a connection terminal that protrudes from the opening of the first box-shaped portion to a position outside of the first box-shaped portion when the smoothing capacitor is accommodated in the first box-shaped portion.

6. The drive device control unit according to claim 1, further comprising:
a step-up device that steps up a power supply voltage, wherein:
the step-up device has a step-up switching element, a step-up capacitor, and a reactor;
the step-up switching element is fixed to a same surface of the first base as that of the switching element module;
the reactor is fixed to the first base; and
the step-up capacitor is fixed to the second base.

7. The drive device control unit according to claim 6, wherein:
the second base has a first box-shaped portion having an opening that is open toward the first base and a bottom portion having an approximately flat plate shape;
the smoothing capacitor is fixedly accommodated in the first box-shaped portion, and the control substrate is fixed to an outer surface of the bottom portion;
the second base has a second box-shaped portion that is provided adjacent to the first box-shaped portion, and which is open in an opposite direction to an opening direction of the first box-shaped portion, and
the step-up capacitor is fixedly accommodated in the second box-shaped portion.

8. The drive device control unit according to claim 7, further comprising:
a noise filter that removes supply noise, wherein the noise filter is fixed to a side of the step-up capacitor opposite to the first box-shaped portion.

9. The drive device control unit according to claim 7, further comprising
a cover member fixed to the second base so as to cover the opening of the second box-shaped portion, wherein a cable connected to the control substrate is fixed to the cover member.

10. The drive device control unit according to claim 9, wherein the cable connects the control substrate to the switching element module, a sensor that detects an operating state of the rotating electrical machine, or electrically connects each part of the drive device control unit.

11. A drive device control unit that controls a drive device including a rotating electrical machine, the drive device control unit comprising:
a control substrate that controls the drive device;
a switching element module that forms an inverter that drives the rotating electrical machine;
a smoothing capacitor that smoothes an input power supply of the inverter;
a first base having the switching element module fixed thereto;
a second base supported by the first base and having the control substrate and the smoothing capacitor fixed to the second base; and
a step-up device that steps up a power supply voltage, wherein:
the step-up device has a step-up switching element, a step-up capacitor, and a reactor;
the step-up switching element is fixed to a same surface of the first base as that of the switching element module;
the reactor is fixed to the first base, and
the step-up capacitor is fixed to the second base.

12. The drive device control unit according to claim 11, wherein:
the second base has a first box-shaped portion having an opening that is open toward the first base and a bottom portion having an approximately flat plate shape, and the smoothing capacitor is fixedly accommodated in the first box-shaped portion, and the control substrate is fixed to an outer surface of the bottom portion.

13. The drive device control unit according to claim 12, wherein the control substrate is fixedly fastened to the bottom portion at a plurality of positions on a peripheral edge of the control substrate and at least one position closer to a middle of the control substrate than the plurality of positions.

14. The drive device control unit according to claim 12, wherein the smoothing capacitor has an approximately rectangular parallelepiped shape and the first box-shaped portion has an inner space of an approximately rectangular parallelepiped shape corresponding to the shape of the smoothing capacitor.

15. The drive device control unit according to claim 12, wherein the smoothing capacitor includes a connection terminal that protrudes from the opening of the first box-shaped portion to a position outside of the first box-shaped portion when the smoothing capacitor is accommodated in the first box-shaped portion.

16. The drive device control unit according to claim 11, wherein:
   the second base has a first box-shaped portion having an opening that is open toward the first base and a bottom portion having an approximately flat plate shape;
   the smoothing capacitor is fixedly accommodated in the first box-shaped portion, and the control substrate is fixed to an outer surface of the bottom portion;
   the second base has a second box-shaped portion that is provided adjacent to the first box-shaped portion, and which is open in an opposite direction to an opening direction of the first box-shaped portion, and
   the step-up capacitor is fixedly accommodated in the second box-shaped portion.

17. The drive device control unit according to claim 16, further comprising:
   a noise filter that removes supply noise, wherein the noise filter is fixed to a side of the step-up capacitor opposite to the first box-shaped portion.

18. The drive device control unit according to claim 16, further comprising
   a cover member fixed to the second base so as to cover the opening of the second box-shaped portion, wherein a cable connected to the control substrate is fixed to the cover member.

19. The drive device control unit according to claim 18, wherein the cable connects the control substrate to the switching element module, a sensor that detects an operating state of the rotating electrical machine, or electrically connects each part of the drive device control unit.

* * * * *